(12) United States Patent
Chevet et al.

(10) Patent No.: US 12,513,316 B2
(45) Date of Patent: Dec. 30, 2025

(54) PROCESSING THE IN-BETWEEN POINTS OF A POINT CLOUD

(71) Applicant: InterDigital VC Holdings, Inc., Wilmington, DE (US)

(72) Inventors: Jean-Claude Chevet, Betton (FR); Yannick Olivier, Thorigne Fouillard (FR); Joan Llach, London (GB)

(73) Assignee: INTERDIGITAL VC HOLDINGS, INC., Wilmington, DE (US)

(*) Notice: Subject to any disclaimer, the term of this patent is extended or adjusted under 35 U.S.C. 154(b) by 748 days.

(21) Appl. No.: 17/440,080

(22) PCT Filed: Jan. 27, 2020

(86) PCT No.: PCT/US2020/015170
§ 371 (c)(1),
(2) Date: Sep. 16, 2021

(87) PCT Pub. No.: WO2020/190374
PCT Pub. Date: Sep. 24, 2020

(65) Prior Publication Data
US 2022/0191519 A1     Jun. 16, 2022

(30) Foreign Application Priority Data
Mar. 20, 2019  (EP) ..................... 19305341

(51) Int. Cl.
*H04N 19/20* (2014.01)
*H04N 19/184* (2014.01)
*H04N 19/70* (2014.01)

(52) U.S. Cl.
CPC ........... *H04N 19/20* (2014.11); *H04N 19/184* (2014.11); *H04N 19/70* (2014.11)

(58) Field of Classification Search
CPC ....... H04N 19/20; H04N 19/184; H04N 19/70
See application file for complete search history.

(56) References Cited

U.S. PATENT DOCUMENTS 10,944,991 B2 *  3/2021  Joshi ................. H04N 19/105
11,122,279 B2 *  9/2021  Joshi ................... H04N 19/44
(Continued)

FOREIGN PATENT DOCUMENTS

CN        1467687 A     1/2004
CN      103718559 A     4/2014
(Continued)

OTHER PUBLICATIONS

Joshi et al. (Improvements to enhanced delta depth coding for V-PCC), Oct. 2018.*
Joshi et al. (Report on Core Experiment CE 2.9 on occupancy map coding), Jan. 2019.*
Hoppe et al., "Surface Reconstruction from Unorganized Points", SIGGRAPH '92: Proceedings of the 19th Annual Conference on Computer Graphics and Interactive Techniques, Jul. 1992, 8 pages.
Sinharoy et al., "Lossless Coding in TMC2", International Organization for Standardization, ISO/IEC JTC1/SC29/WG11, Coding of Moving Picture and Audio, Document MPEG2018/m42170, Gwangju, Korea, Jan. 2018, 10 pages.
(Continued)

*Primary Examiner* — James T Boylan
(74) *Attorney, Agent, or Firm* — VOLPE KOENIG

(57) ABSTRACT

At least one embodiment relates to signaling at least one texture patch representing a texture value of at least one in-between 3D sample, a texture patch being a set of 2D samples representing texture values of orthogonally projected 3D samples of a point cloud along projection lines onto a projection plane, and said at least one in-between 3D sample being a 3D sample of the point cloud having a depth value greater than a nearer 3D sample of the point cloud and lower than a farther 3D sample of the point cloud, said at least one in-between 3D sample and said nearer and farther 3D samples being projected along the same projection line.

18 Claims, 20 Drawing Sheets

(56) References Cited

U.S. PATENT DOCUMENTS

| | | |
|---|---|---|
| 2013/0016112 A1 | 1/2013 | Burley et al. |
| 2013/0022113 A1 | 1/2013 | Chen et al. |
| 2018/0268570 A1 | 9/2018 | Budagavi et al. |
| 2019/0311502 A1* | 10/2019 | Mammou ............... G06T 17/00 |
| 2020/0153885 A1* | 5/2020 | Lee ......................... G06T 15/04 |
| 2020/0219290 A1* | 7/2020 | Tourapis .............. H04N 19/597 |
| 2020/0302655 A1* | 9/2020 | Oh .......................... G06T 9/001 |
| 2022/0058832 A1 | 2/2022 | Kuma et al. |
| 2023/0306646 A1* | 9/2023 | Martemianov ......... G06T 17/00 |
| | | 382/232 |

FOREIGN PATENT DOCUMENTS

| | | |
|---|---|---|
| CN | 105574922 A | 5/2016 |
| CN | 106576175 A | 4/2017 |
| CN | 108241819 A | 7/2018 |
| CN | 108242064 A | 7/2018 |
| CN | 108810571 A | 11/2018 |
| EP | 3742401 A1 | 11/2020 |
| JP | 2022036353 A | 3/2022 |
| JP | 2022525599 A | 5/2022 |
| WO | 2019142666 A1 | 7/2019 |
| WO | 2020186060 A1 | 9/2020 |

OTHER PUBLICATIONS

Cai et al., "Signal Multiple Points along One Projection Line in PCC TMC2 Lossless Mode", International Organization for Standardization, ISO/IEC JTC1/SC29/WG11, Coding of Moving Picture and Audio, Document MPEG2018/m42652, San Diego, California, United States, Apr. 2018, 4 pages.

Chevet et al., "Texture patch for Enhanced Occupancy Map for Depth", International Organization for Standardization, ISO/IEC JTC1/SC29/WG11, Document: MPEG2018/ m47477, 126th Meeting, Geneva, Switzerland, Mar. 2019, 11 pages.

Zakharchenko, Vladyslav, "V-PCC Codec Description", International Organization for Standardization, ISO/IEC JTC1/SC29/WG11, Document: MPEG2019/N18190, Marrakech, Morrocco, Jan. 2019, 38 pages.

Sevom et al., " Geometry-Guided 3D Data Interpolation for Projection-Based Dynamic Point Cloud Coding", 7th European Workshop on Visual Information Processing (EUVIP), Nov. 26, 2018, 6 pages.

Song, Lifang., "Research on 3D Measurement Based on encoded structure light", Wuyi University, Jun. 3, 2017, 65 pages.

* cited by examiner

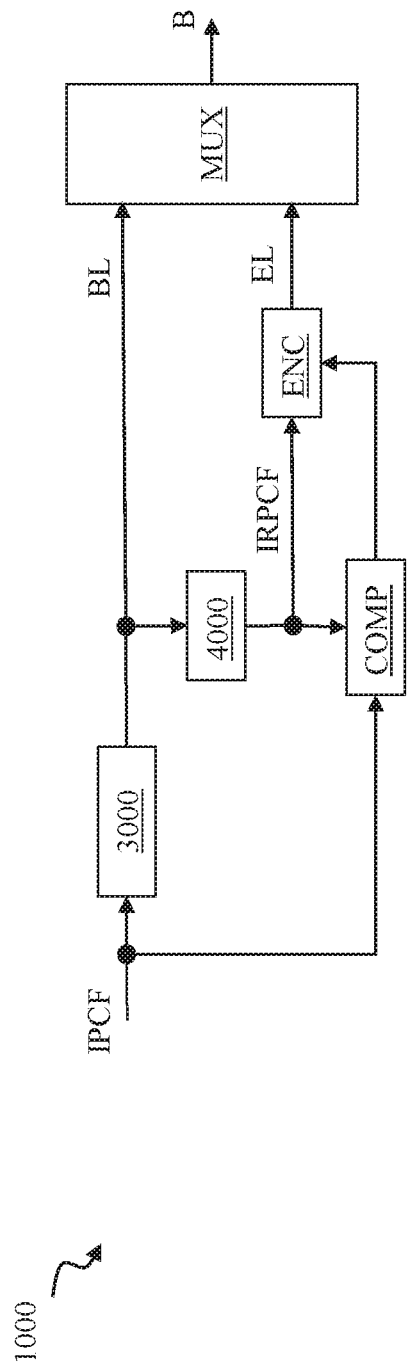
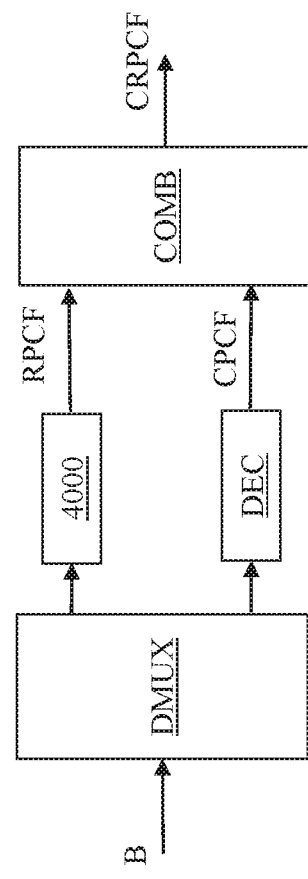
Fig. 1
Fig. 2

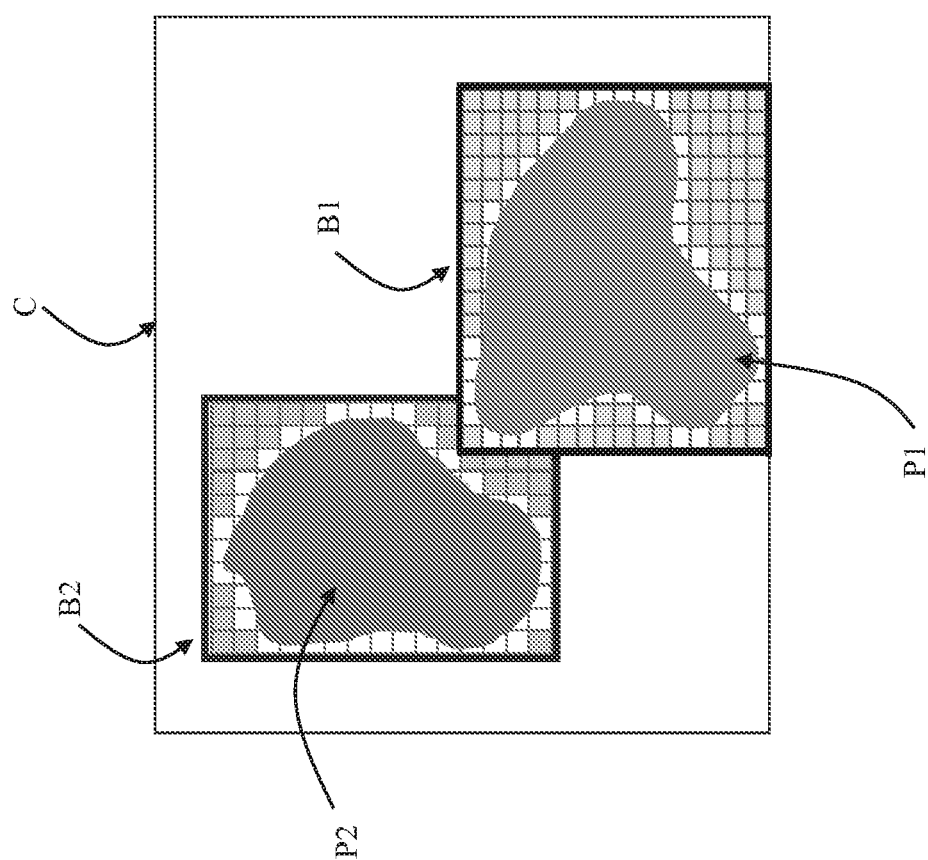

| | Descriptor |
|---|---|
| enhanced_occupancy_map_texture_patch_data_unit( frmIdx, patchIndex ) { | |
| etpdu_2d_shift_u[ frmIdx ][ patchIndex ] | ae(v) |
| etpdu_2d_shift_v[ frmIdx ][ patchIndex ] | ae(v) |
| etpdu_2d_delta_size_u[ frmIdx ][ patchIndex ] | ae(v) |
| etpdu_2d_delta_size_v[ frmIdx ][ patchIndex ] | ae(v) |
| for( p = 0; p <= pfdu_patch_count_minus1; p++ ) { | |
| etpdu_points[ frmIdx ][ patchIndex ][ p ] | ae(v) |
| } | |
| } | |

| enhanced_occupancy_map_texture_patch_data_unit( frmIdx, patchIndex ) { | Descriptor |
|---|---|
| etpdu_2d_shift_u[ frmIdx ][ patchIndex ] | ae(v) |
| etpdu_2d_shift_v[ frmIdx ][ patchIndex ] | ae(v) |
| etpdu_2d_delta_size_u[ frmIdx ][ patchIndex ] | ae(v) |
| etpdu_2d_delta_size_v[ frmIdx ][ patchIndex ] | ae(v) |
| etpdu_patch_count[ frmIdx ][ patchIndex ] | |
| for( p = 0; p < etpdu_patch_count; p++ ) { | |
| etpdu_ref_index[ frmIdx ][ patchIndex ][p] | ae(v) |
| etpdu_points[ frmIdx ][ patchIndex ][p] | ae(v) |
| etpdu_offset[ frmIdx ][ patchIndex ][p] | ae(v) |
| } | |
| } | |

Fig. 8b

| Enhanced_occupancy_map_texture_patch_data_unit( frmIdx, patchIndex ) { | Descriptor |
|---|---|
| etpdu_2d_shift_u[ frmIdx ][ patchIndex ] | ae(v) |
| etpdu_2d_shift_v[ frmIdx ][ patchIndex ] | ae(v) |
| etpdu_2d_delta_size_u[ frmIdx ][ patchIndex ] | ae(v) |
| etpdu_2d_delta_size_v[ frmIdx ][ patchIndex ] | ae(v) |
| etpdu_patch_count[ frmIdx ][ patchIndex ] | |
| for( p = 0; p < etpdu_patch_count; p++ ) { | |
| etpdu_points[ frmIdx ][ patchIndex ][p] | ae(v) |
| if( etpdu_points[ frmIdx ][ patchIndex ][p] ) { | |
| etpdu_offset[ frmIdx ][ patchIndex ][p] | ae(v) |
| } | |
| } | |
| } | |

Fig. 8c

| | Descriptor |
|---|---|
| enhanced_occupancy_map_texture_patch_data_unit( frmIdx, patchIndex ) { | |
|   etpdu_2d_shift_u[ frmIdx ][ patchIndex ] | ae(v) |
|   etpdu_2d_shift_v[ frmIdx ][ patchIndex ] | ae(v) |
|   etpdu_2d_delta_size_u[ frmIdx ][ patchIndex ] | ae(v) |
|   etpdu_2d_delta_size_v[ frmIdx ][ patchIndex ] | ae(v) |
|   etpdu_mode[ frmIdx ][ patchIndex ] | ae(v) |
|   if ( etpdu_mode == 0 ) { | |
|     for( p = 0; p <= pfdu_patch_count_minus1; p++ ) { | |
|       etpdu_points[ frmIdx ][ patchIndex ][ p ] | ae(v) |
|     } | |
|   } else if (etpdu_mode == 1) { | |
|     etpdu_patch_count[ frmIdx ][ patchIndex ] | ae(v) |
|     for( p = 0; p < etpdu_patch_count; p++ ) { | |
|       etpdu_ref_index[ frmIdx ][ patchIndex ][p] | ae(v) |
|       etpdu_points[ frmIdx ][ patchIndex ][p] | ae(v) |
|       etpdu_offset[ frmIdx ][ patchIndex ][p] | ae(v) |
|     } | |
|   } else { | |
|     etpdu_patch_count[ frmIdx ][ patchIndex ] | ae(v) |
|     for( p = 0; p < etpdu_patch_count; p++ ) { | |
|       etpdu_points[ frmIdx ][ patchIndex ][p] | ae(v) |
|       if( etpdu_points[ frmIdx ][ patchIndex ][p]) { | |
|         etpdu_offset[ frmIdx ][ patchIndex ][ p ] | ae(v) |
|       } | |
|     } | |
|   } | |
| } | |

Fig. 8d

| sequence_parameter_set() { | Descriptor |
|---|---|
| ... | |
| sps_pcm_patch_enabled_flag | u(1) |
| if( sps_enhanced_occupancy_map_for_depth_enabled_flag ) | |
| sps_enhanced_occupancy_map_texture_patch_present_flag | u(1) |
| if( sps_pcm_patch_enabled_flag || (sps_enhanced_occupancy_map_for_depth_enabled_flag && | |
| sps_enhanced_occupancy_map_texture_patch_present_flag ) ) | |
| sps_pcm_patch_separate_video_present_flag | u(1) |
| occupancy_parameter_set() | |
| ... | |
| } | |

Fig. 10

| sequence_parameter_set() { | Descriptor |
|---|---|
| ... | |
| sps_pcm_patch_enabled_flag | u(1) |
| if( sps_pcm_patch_enabled_flag ) | |
| sps_pcm_patch_separate_video_present_flag | u(1) |
| if ( sps_enhanced_occupancy_map_for_depth_enabled_flag ) { | |
| sps_enhanced_occupancy_map_texture_patch_present_flag | u(1) |
| if( sps_enhanced_occupancy_map_texture_patch_present_flag ) | |
| sps_eom_texture_patch_separate_video_present_flag | u(1) |
| } | |
| occupancy_parameter_set() | |
| ... | |
| } | |

Fig. 11

```
patch_frame_data_unit( frmIdx ) {                                           Descriptor
    ...
    if( sps_pcm_patch_enabled_flag ) {
    }
    if( sps_enhanced_occupancy_map_texture_patch_present_flag) {            u(1)
        p = PfduTotalNumberOfPatches[ frmIdx ]
        pfdu_patch_model[ frmIdx ][ p ] = pfh_type[ frmIdx ] = = I ? I_EOMT : P_EOMT
        patch_information_data( frmIdx, p, pfdu_patch_model[ frmIdx ][ p ] )
        PfduTotalNumberOfPatches[ frmIdx ]++
    }
    ...
    if( sps_point_local_reconstruction_enabled_flag )
    ...
}
```

Fig. 12

| pfdu_patch_mode | Identifier | Description |
|---|---|---|
| 0 | I_INTRA | Non-predicted Patch mode |
| 1 | I_PCM | PCM Point Patch mode |
| 2 | I_EOMT | Enhanced Occupancy Map Texture Patch mode |

| pfdu_patch_mode | Identifier | Description |
|---|---|---|
| 0 | P_SKIP | Patch Skip mode |
| 1 | P_INTRA | Non-predicted Patch mode |
| 2 | P_INTER | Inter predicted Patch mode |
| 3 | P_PCM | PCM Point Patch mode |
| 4 | P_EOMT | Enhanced Occupancy Map Texture Patch mode |

Fig. 13

| | Descriptor |
|---|---|
| patch_frame_data_unit( frmIdx ) { | |
|   pfdu_patch_count_minus1 | u(32) |
|   if( pfh_type[ frmIdx ] != I ) | |
|     pfdu_inter_patch_count | ae(v) |
|   else | |
|     pfdu_inter_patch_count = 0 | |
|   if( sps_enhanced_occupancy_map_texture_patch_present_flag ) | |
|     pfdu_eom_texture_patch_count | ae(v) |
|   else | |
|     pfdu_eom_texture_patch_count = 0 | |
|   for( p = 0; p < pfdu_inter_patch_count; p++ ) { | |
|     ... | |
|   } | |
|   if( sps_pcm_patch_enabled_flag ) { | |
|     ... | |
|   } | |
|   for( p = PfduTotalNumberOfPatches[ frmIdx ]; | |
|     p < PfduTotalNumberOfPatches[ frmIdx ] + pfdu_eom_texture_patch_count; | |
|     p++ ) { | |
|     pfdu_patch_model[ frmIdx ][ p ] = pfh_type[ frmIdx ] == I ? I_EOMT : P_EOMT | |
|     patch_information_data( frmIdx, p, pfdu_patch_model[ frmIdx ][ p ] ) | |
|   } | |
|   PfduTotalNumberOfPatches[ frmIdx ] += pfdu_eom_texture_patch_count | |
|   if( sps_point_local_reconstruction_enabled_flag ) | |
|     ... | |
| } | |

Fig. 14

| | Descriptor |
|---|---|
| patch_information_data (frmIdx, p, patch_mode ) ( ) { | |
|   if(patch mode == P_SKIP ) { | |
|   // skip mode. | |
|   // currently not supported but added it for convenience. Could easily be removed | |
|   } | |
|   else if(patch mode == I_INTRA || patch mode == P_INTRA) { | |
|     ... | |
|   } | |
|   else if( patch mode == P_INTER) | |
|     delta_patch_data_unit( frmIdx, p ) | |
|   else if(patch mode == I_PCM || patch mode == P_PCM ) | |
|     pcm_patch_data_unit( frmIdx, p) | |
|   else if(patch mode == I_EOMT || patch mode == P_EOMT ) | |
|     enhanced_occupancy_map_texture_patch_data_unit ( frmIdx, p ) | |
| } | |

Fig. 15

PROCESSING THE IN-BETWEEN POINTS OF A POINT CLOUD

This application claims the benefit, under 35 U.S.C. § 371 of International Application PCT/US2020/015170, filed Jan. 27, 2020, which was published in accordance with PCT Article 21(2) on Sep. 24, 2020, in English, and which claims the benefit of European Patent Application No. 19305341.0, filed Mar. 20, 2019.

TECHNICAL FIELD

At least one of the present embodiments relates generally to a processing of a point cloud.

BACKGROUND

The present section is intended to introduce the reader to various aspects of art, which may be related to various aspects of at least one of the present embodiments that is described and/or claimed below. This discussion is believed to be helpful in providing the reader with background information to facilitate a better understanding of the various aspects of at least one embodiment.

Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations allows for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

The automotive industry and the autonomous car are also domains in which point clouds may be used. Autonomous cars should be able to "probe" their environment to make good driving decisions based on the reality of their immediate neighbors. Typical sensors like LIDARs (Light Detection And Ranging) produce dynamic point clouds that are used by a decision engine. These point clouds are not intended to be viewed by a human being and they are typically small, not necessarily colored, and dynamic with a high frequency of capture. These point clouds may have other attributes like the reflectance provided by the LIDAR as this attribute provides good information on the material of the sensed object and may help in making decisions.

Virtual Reality and immersive worlds have become hot topics recently and are foreseen by many as the future of 2D flat video. The basic idea is to immerse the viewer in an environment that surrounds the viewer, in contrast to a standard TV in which the viewer can only look at the virtual world in front of the viewer. There are several gradations in the immersivity depending on the freedom of the viewer in the environment. A point cloud is a good format candidate for distributing Virtual Reality (VR) worlds.

It is important in many applications to be able to distribute dynamic point clouds to an end-user (or store them in a server) by consuming only a reasonable amount of bit-rate (or storage space for storage applications) while maintaining an acceptable (or preferably very good) quality of experience. Efficient compression of these dynamic point clouds is a key point in order to make the distribution chain of many immersive worlds practical.

At least one embodiment has been devised with the foregoing in mind.

SUMMARY

The following presents a simplified summary of at least one of the present embodiments in order to provide a basic understanding of some aspects of the present disclosure. This summary is not an extensive overview of an embodiment. It is not intended to identify key or critical elements of an embodiment. The following summary merely presents some aspects of at least one of the present embodiments in a simplified form as a prelude to the more detailed description provided elsewhere in the document.

According to a general aspect of at least one embodiment, there is provided a method comprising signaling at least one texture patch representing a texture value of at least one in-between 3D sample, a texture patch being a set of 2D samples representing texture values of orthogonally projected 3D samples of a point cloud along projection lines onto a projection plane, and said at least one in-between 3D sample being a 3D sample of the point cloud having a depth value greater than a nearer 3D sample of the point cloud and lower than a farther 3D sample of the point cloud, said at least one in-between 3D sample and said nearer and farther 3D samples being projected along the same projection line.

According to an embodiment, signaling a texture patch representing texture values of at least one in-between 3D sample comprises:
  adding, in the bitstream, at least one syntax element representing a 2D location of said texture patch defined in a 2D grid, and a size of said texture patch;
  transmitting the bitstream; and
  retrieving from the bitstream said at least one syntax element and extracting from said at least one retrieved syntax element, a 2D location of said texture patch defined in a 2D grid, and a size of said texture patch.

According to an embodiment, said at least one syntax element may also signal a number of 2D samples of a patch of the 2D grid.

According to an embodiment, said at least one syntax element may also signal the number of texture patches in the 2D grid and an offset to determine a starting location of a texture patch.

According to an embodiment, said at least one syntax element may also signal an index of a texture patch.

According to an embodiment, a syntax element may also signal that said at least one syntax element added in the bitstream are signalled at different levels of whole syntax representing the point cloud frame.

According to another general aspect of at least one embodiment, there is provided a method comprising analyzing an orthogonal projection of a point cloud frame onto a projection plane to derive a texture value of at least one in-between 3D samples; mapping said at least one texture value into at least one texture patch; packing said at least one texture patch into a texture image; and signaling, in a bitstream, said at least one texture patch according to an above method.

According to another general aspect of at least one embodiment, there is provided a method comprising deriving at least one texture patch from at least one syntax element signaled, in a bitstream, according to an above signaling method; deriving at least one texture value from said at least one texture patch; and assigning said at least one texture value to at least one in-between 3D sample.

One or more of at least one of embodiment also provide a device, a computer program product, a non-transitory computer readable medium and a signal.

The specific nature of at least one of the present embodiments as well as other objects, advantages, features and uses of said at least one of the present embodiments will become evident from the following description of examples taken in conjunction with the accompanying drawings.

BRIEF DESCRIPTION OF DRAWINGS

In the drawings, examples of several embodiments are illustrated. The drawings show:

FIG. 1 illustrates a schematic block diagram of an example of a two-layer-based point cloud encoding structure in accordance with at least one of the present embodiments;

FIG. 2 illustrates a schematic block diagram of an example of a two-layer-based point cloud decoding structure in accordance with at least one of the present embodiments;

FIG. 3a illustrates an example of a canvas comprising 2 patches and their 2D bounding boxes;

FIG. 7 illustrates an example of a method for signaling at least one EOM texture patch in accordance with at least one of the present embodiments;

FIG. 8a-d illustrate examples of syntax elements in accordance with at least one embodiment of step 710;

FIG. 10 illustrate examples of syntax elements in accordance with an embodiment of step 710;

FIG. 11 illustrates an example of syntax elements in accordance with said variant of said embodiment of step 710;

FIG. 12 illustrates examples of syntax elements in accordance with a variant of an embodiment of step 710;

FIG. 13 illustrates examples of tables defining patch modes in accordance with at least one of the present embodiments;

FIG. 14 illustrates examples of syntax elements in accordance with a variant of an embodiment of step 710;

FIG. 15 illustrates examples of syntax elements in accordance with an embodiment of step 710;

DETAILED DESCRIPTION

At least one of the present embodiments is described more fully hereinafter with reference to the accompanying figures, in which examples of at least one of the present embodiments are shown. An embodiment may, however, be embodied in many alternate forms and should not be construed as limited to the examples set forth herein. Accordingly, it should be understood that there is no intent to limit embodiments to the particular forms disclosed. On the contrary, the disclosure is intended to cover all modifications, equivalents, and alternatives falling within the spirit and scope of this application.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Similar or same elements of figures are referenced with the same reference numbers.

Some figures represent syntax tables widely used in V-PCC for defining the structure of a bitstream that conforms with V-PCC. In those syntax tables, the term ' . . . ' denotes unchanged portions of the syntax with respect to the original definition given in V-PCC and removed in the figures to facilitate reading. Bold terms in figures indicate that a value for this term is obtained by parsing a bitstream. The right column of the syntax tables indicates the number of bits for encoding a data of a syntax element. For example, u(4) indicates that 4 bits are used for encoding a data, u(8) indicates 8 bits, ae(v) indicates that the integer value v is arithmetic encoded using CABAC (Contex-Adaptive-Binary-Arithmetic Coding) for example.

The aspects described and contemplated below may be implemented in many different forms. FIGS. 1-18 below provide some embodiments, but other embodiments are contemplated and the discussion of FIGS. 1-18 does not limit the breadth of the implementations.

At least one of the aspects generally relates to point cloud encoding and decoding, and at least one other aspect generally relates to transmitting a bitstream generated or encoded.

Figure 3:
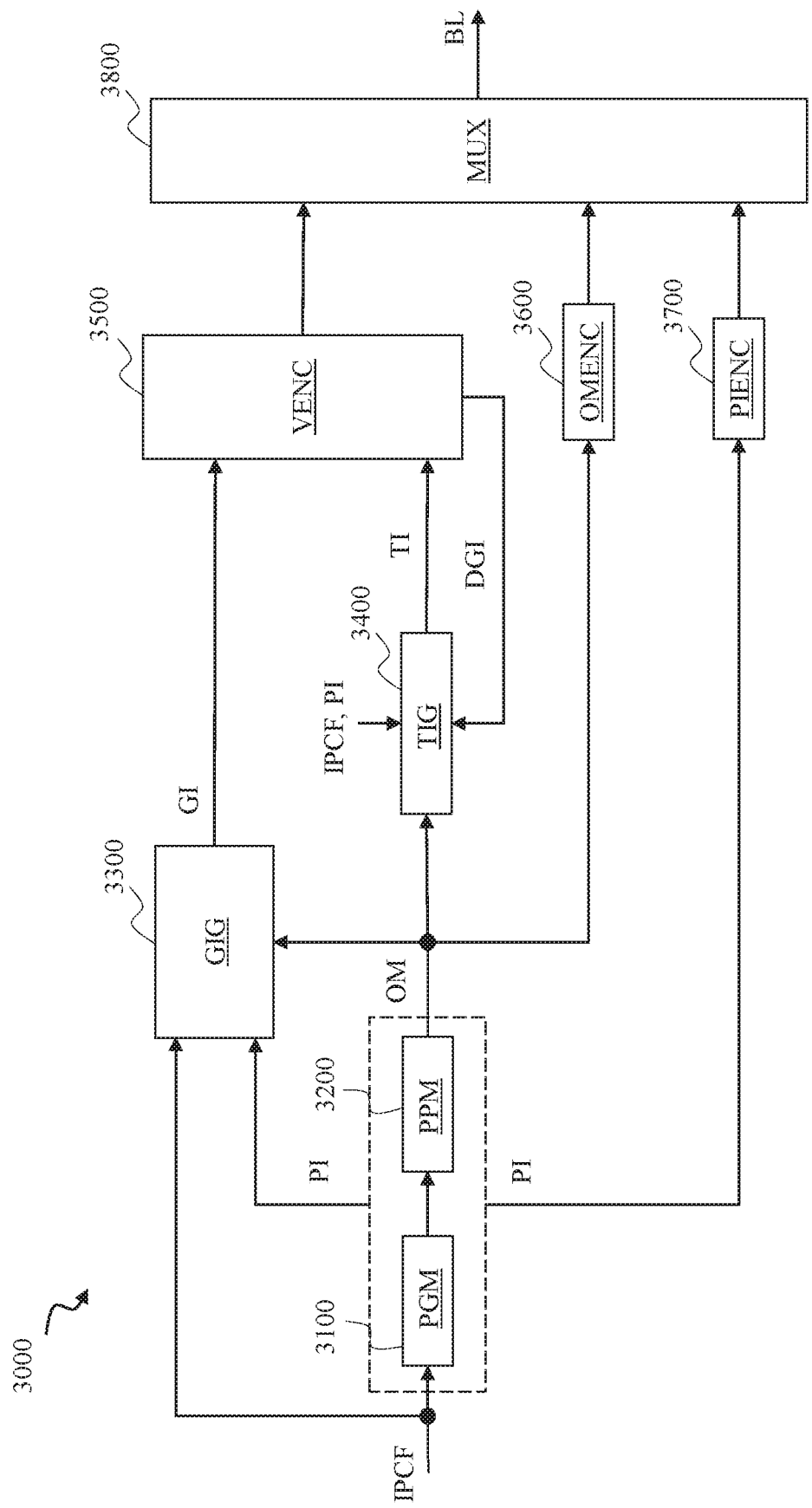
FIG. 3 illustrates a schematic block diagram of an example of an image-based point cloud encoder in accordance with at least one of the present embodiments.
Figure 16:
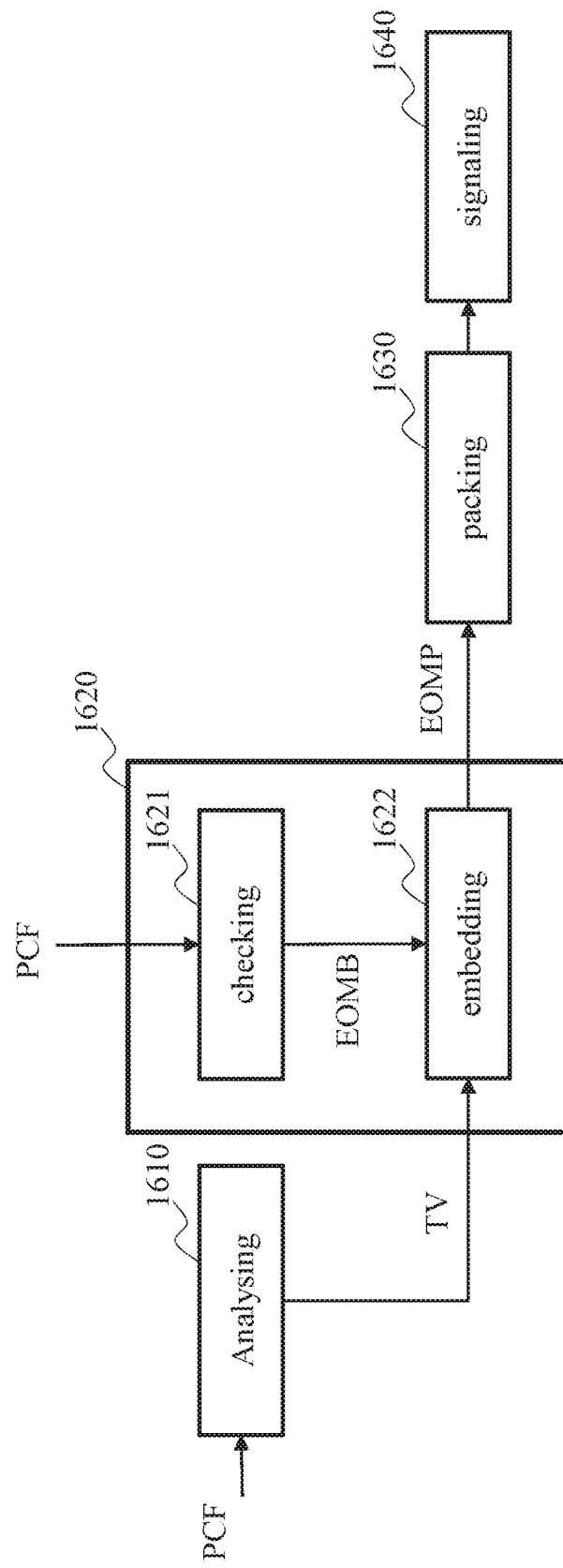
FIG. 16 illustrates a block diagram of a method for coding the texture values of in-between 3D samples in accordance with at least one of the present embodiments.

More precisely, various methods and other aspects described herein may be used to modify modules, for example, the modules 3100, 3200, 3400 and 3700 of FIG. 3 may be modified to implement the method of FIG. 16. The modules 4400 and 4600 may also be modified to implement the method of FIG. 17.

Moreover, the present aspects are not limited to MPEG standards such as MPEG-1 part 5 that relates to the Point Cloud Compression, and may be applied, for example, to other standards and recommendations, whether pre-existing or future-developed, and extensions of any such standards and recommendations (including MPEG-1 part 5). Unless indicated otherwise, or technically precluded, the aspects described in this application may be used individually or in combination.

In the following, image data refer to data, for example, one or several arrays of 2D samples in a specific image/video format. A specific image/video format may specify information pertaining to pixel values of an image (or a video). A specific image/video format may also specify information which may be used by a display and/or any other apparatus to visualize and/or decode an image (or video) for example. An image typically includes a first component, in the shape of a first 2D array of samples, usually representative of luminance (or luma) of the image. An image may also include a second component and a third component, in the shape of other 2D arrays of samples, usually representative of the chrominance (or chroma) of the image. Some embodiments represent the same information using a set of 2D arrays of color samples, such as the traditional tri-chromatic RGB representation.

A pixel value is represented in one or more embodiments by a vector of C values, where C is the number of components. Each value of a vector is typically represented with a number of bits which may define a dynamic range of the pixel values.

An image block means a set of pixels which belong to an image. The pixel values of an image block (or image block data) refer to the values of the pixels which belong to this image block. An image block may have an arbitrary shape, although rectangles are common.

A point cloud may be represented by a dataset of 3D samples within a 3D volumetric space that have unique coordinates and that may also have one or more attributes.

A 3D sample of this data set may be defined by its spatial location (X, Y, and Z coordinates in a 3D space) and possibly by one or more associated attributes such as a color, represented in the RGB or YUV color space for example, a transparency, a reflectance, a two-component normal vector or any feature representing a feature of this sample. For example, a 3D sample may be defined by 6 components (X, Y, Z, R, G, B) or equivalently (X, Y, Z, y, U, V) where (X, Y, Z) defines the coordinates of a point in a 3D space and (R, G, B) or (y, U, V) defines a color of this 3D sample. The same type of attribute may be present multiple times. For example, multiple color attributes may provide color information from different points of view.

A point cloud may be static or dynamic depending on whether or not the cloud changes with respect to time. A static point cloud or an instance of a dynamic point cloud is usually denoted as a point cloud frame. It should be noticed that in the case of a dynamic point cloud, the number of points is generally not constant but, on the contrary, generally changes with time. More generally, a point cloud may be considered as dynamic if anything changes with time, such as, for example, the number of points, the position of one or more points, or any attribute of any point.

As an example, a 2D sample may be defined by 6 components (u, v, Z, R, G, B) or equivalently (u, v, Z, y, U, V). (u, v) defines the coordinates of a 2D sample in a 2D space of the projection plane. Z is the depth value of a projected 3D sample onto this projection plane. (R, G, B) or (y, U, V) defines a color of this 3D sample.

FIG. 1 illustrates a schematic block diagram of an example of a two-layer-based point cloud encoding structure 1000 in accordance with at least one of the present embodiments.

The two-layer-based point cloud encoding structure 1000 may provide a bitstream B representative of an input point cloud frame IPCF. Possibly, said input point cloud frame IPCF represents a frame of a dynamic point cloud. Then, a frame of said dynamic point cloud may be encoded by the two-layer-based point cloud encoding structure 1000 independently from another frame.

Basically, the two-layer-based point cloud encoding structure 1000 may provide ability to structure the bitstream B as a Base Layer BL and an Enhancement Layer EL. The base layer BL may provide a lossy representation of an input point cloud frame IPCF and the enhancement layer EL may provide a higher quality (possibly lossless) representation by encoding isolated points not represented by the base layer BL.

Figure 4:
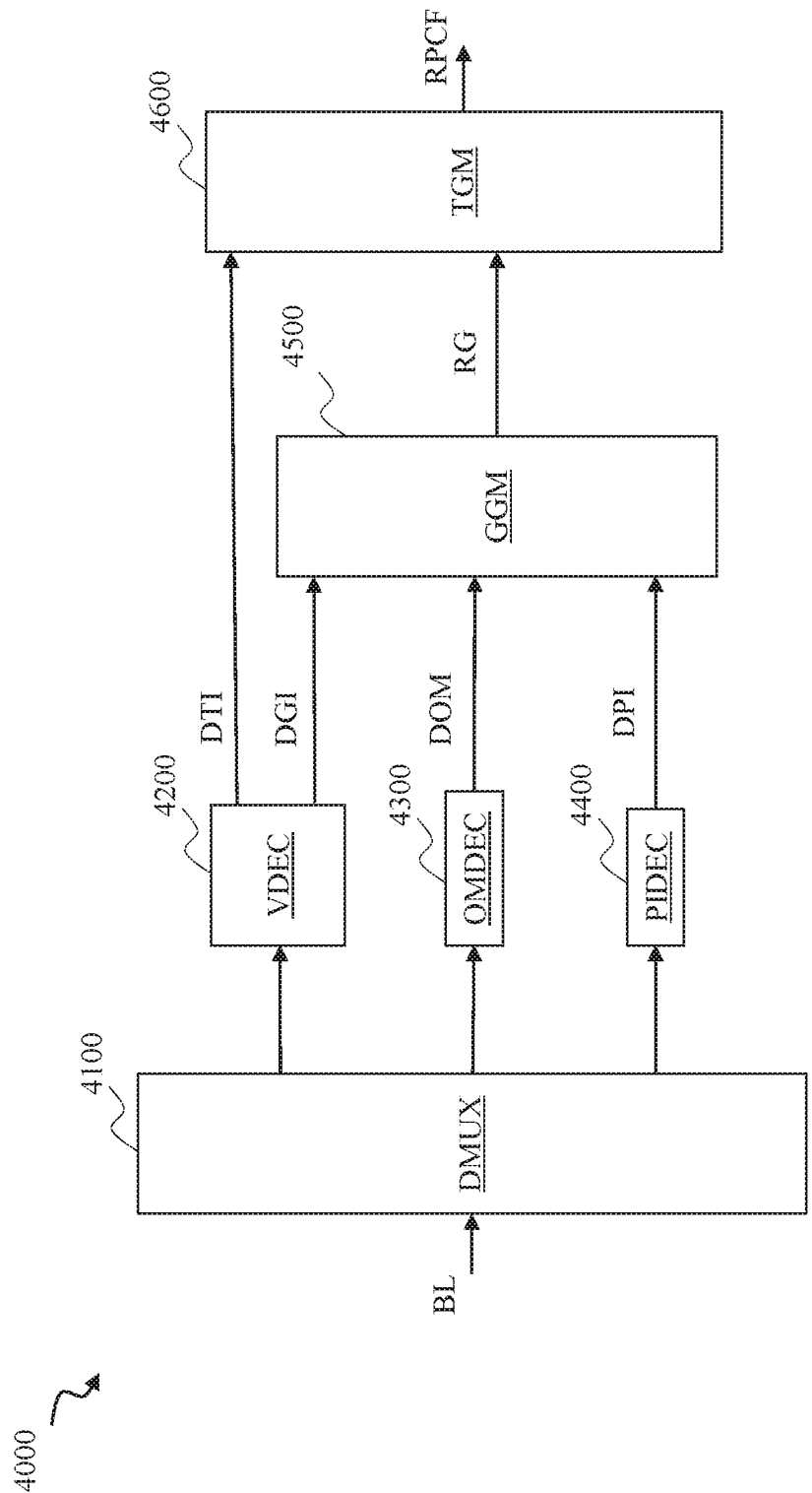
FIG. 4 illustrates a schematic block diagram of an example of an image-based point cloud decoder in accordance with at least one of the present embodiments.

The base layer BL may be provided by an image-based encoder 3000 as illustrated in FIG. 3. Said image-based encoder 3000 may provide geometry/texture images representing the geometry/attributes of 3D samples of the input point cloud frame IPCF. It may allow isolated 3D samples to be discarded. The base layer BL may be decoded by an image-based decoder 4000 as illustrated in FIG. 4 that may provide an intermediate reconstructed point cloud frame IRPCF.

Then, back to the two-layer-based point cloud encoding 1000 in FIG. 1, a comparator COMP may compare the 3D samples of the input point cloud frame IPCF to the 3D samples of the intermediate reconstructed point cloud frame IRPCF in order to detect/locate missed/isolated 3D samples. Next, an encoder ENC may encode the missed 3D samples and may provide the enhancement layer EL. Finally, the base layer BL and the enhancement layer EL may be multiplexed together by a multiplexer MUX so as to generate the bitstream B.

According to an embodiment, the encoder ENC may comprise a detector that may detect and associate a 3D reference sample R of the intermediate reconstructed point cloud frame IRPCF to a missed 3D samples M.

For example, a 3D reference sample R associated with a missed 3D sample M may be its nearest neighbor of M according to a given metric.

According to an embodiment, the encoder ENC may then encode the spatial locations of the missed 3D samples M and their attributes as differences determined according to spatial locations and attributes of said 3D reference samples R.

In a variant, those differences may be encoded separately.

For example, for a missed 3D sample M, with spatial coordinates x(M), y(M) and z(M), a x-coordinate position difference Dx(M), a y-coordinate position difference Dy(M), a z-coordinate position difference Dz(M), a R-attribute component difference Dr(M), a G-attribute component difference Dg(M) and the B-attribute component difference Db(M) may be calculated as follows:

$$Dx(M)=x(M)-x(R),$$

where x(M) is the x-coordinate of the 3D sample M, respectively R in a geometry image provided by FIG. 3, $$Dy(M)=y(M)-y(R)$$

where y(M) is the y-coordinate of the 3D sample M, respectively R in a geometry image provided by FIG. 3, $$Dz(M)=z(M)-z(R)$$

where z(M) is the z-coordinate of the 3D sample M, respectively R in a geometry image provided by FIG. 3, $$Dr(M)=R(M)-R(R).$$

where R(M), respectively R(R) is the r-color component of a color attribute of the 3D sample M, respectively R, $$Dg(M)=G(M)-G(R).$$

where G(M), respectively G(R) is the g-color component of a color attribute of the 3D sample M, respectively R, $$Db(M)=B(M)-B(R).$$

where B(M), respectively B(R) is the b-color component of a color attribute of the 3D sample M, respectively R.

FIG. 2 illustrates a schematic block diagram of an example of a two-layer-based point cloud decoding structure 2000 in accordance with at least one of the present embodiments.

The behavior of the two-layer-based point cloud decoding structure 2000 depends on its capabilities.

A two-layer-based point cloud decoding structure 2000 with limited capabilities may access only the base layer BL from the bitstream B by using a de-multiplexer DMUX, and then may provide a faithful (but lossy) version IRPCF of the input point cloud frame IPCF by decoding the base layer BL by a point cloud decoder 4000 as illustrated in FIG. 4.

A two-layer-based point cloud decoding structure 2000 with full capabilities may access both the base layer BL and the enhancement layer EL from the bitstream B by using the de-multiplexer DMUX. The point cloud decoder 4000, as illustrated in FIG. 4, may determine the intermediate reconstructed point cloud frame IRPCF from the base layer BL. The decoder DEC may determine a complementary point cloud frame CPCF from the enhancement layer EL. A combiner COM then may combine together the intermediate reconstructed point cloud frame IRPCF and the complementary point cloud frame CPCF to therefore provide a higher quality (possibly lossless) representation (reconstruction) CRPCF of the input point cloud frame IPCF.

FIG. 3 illustrates a schematic block diagram of an example of an image-based point cloud encoder 3000 in accordance with at least one of the present embodiments.

The image-based point cloud encoder 3000 leverages existing video codecs to compress the geometry and texture (attribute) information of a dynamic point cloud. This is accomplished by essentially converting the point cloud data into a set of different video sequences.

In particular embodiments, two videos, one for capturing the geometry information of the point cloud data and another for capturing the texture information, may be generated and compressed using existing video codecs. An example of an existing video codec is the HEVC Main profile encoder/decoder (ITU-T H.265 Telecommunication standardization sector of ITU (February 2018), series H: audiovisual and multimedia systems, infrastructure of audiovisual services—coding of moving video, High efficiency video coding, Recommendation ITU-T H.265).

Additional metadata that are used to interpret the two videos are typically also generated and compressed separately. Such additional metadata includes, for example, an occupancy map OM and/or auxiliary patch information PI.

The generated video bitstreams and the metadata may be then multiplexed together so as to generate a combined bitstream.

It should be noted that the metadata typically represents a small amount of the overall information. The bulk of the information is in the video bitstreams.

An example of such a point cloud coding/decoding process is given by the Test model Category 2 algorithm (also denoted V-PCC) that implements the MPEG draft standard as defined in ISO/IEC JTC1/SC29/WG11 MPEG2019/w18180 (January 2019, Marrakesh).

In step 3100, a module PGM may generate at least one patch by decomposing 3D samples of a data set representative of the input point cloud frame IPCF to 2D samples on a projection plane using a strategy that provides best compression.

A patch may be defined as a set of 2D samples.

For example, in V-PCC, a normal at every 3D sample is first estimated as described, for example, in Hoppe et al. (Hugues Hoppe, Tony DeRose, Tom Duchamp, John McDonald, Werner Stuetzle. Surface reconstruction from unorganized points. *ACM SIGGRAPH* 1992 *Proceedings,* 71-78). Next, an initial clustering of the input point cloud frame IPCF is obtained by associating each 3D sample with one of the six oriented planes of a 3D bounding box encompassing the 3D samples of the input point cloud frame IPCF. More precisely, each 3D sample is clustered and associated with an oriented plane that has the closest normal (that is maximizes the dot product of the point normal and the plane normal). Then the 3D samples are projected to their associated planes. A set of 3D samples that forms a connected area in their plane is referred as a connected component. A connected component is a set of at least one 3D sample having similar normal and a same associated oriented plane. The initial clustering is then refined by iteratively updating the cluster associated with each 3D sample based on its normal and the clusters of its nearest neighboring samples. The final step consists of generating one patch from each connected component, that is done by projecting the 3D samples of each connected component onto the oriented plane associated with said connected component. A patch is associated with auxiliary patch information PI that represents auxiliary patch information defined for each patch to interpret the projected 2D samples that correspond to the geometry and/or attribute information.

In V-PCC, for example, the auxiliary patch information PI includes 1) information indicating one of the six oriented planes of a 3D bounding box encompassing the 3D samples of a connected component; 2) information relative to the plane normal; 3) information determining the 3D location of a connected component relative to a patch represented in terms of depth, tangential shift and bi-tangential shift; and 4) information such as coordinates (u0, v0, u1, v1) in a projection plane defining a 2D bounding box encompassing a patch.

In step 3200, a patch packing module PPM may map (place) at least one generated patch onto a 2D grid (also called canvas) without any overlapping in a manner that typically minimizes the unused space, and may guarantee that every T×T (for example, 16×16) block of the 2D grid is associated with a unique patch. A given minimum block size T×T of the 2D grid may specify the minimum distance between distinct patches as placed on this 2D grid. The 2D grid resolution may depend on the input point cloud size and its width W and height H and the block size T may be transmitted as metadata to the decoder.

The auxiliary patch information PI may further include information relative to an association between a block of the 2D grid and a patch.

In V-PCC, the auxiliary information PI may include a block to patch index information (BlockToPatch) that determines an association between a block of the 2D grid and a patch index.

FIG. 3a illustrates an example of a canvas C comprising 2 patches P1 and P2 and their associated 2D bounding boxes B1 and B2. Note that two bounding boxes may overlap in the canvas C as illustrated on FIG. 3a. The 2D grid (the splitting of the canvas) is only represented inside the bounding box but the splitting of the canvas also occurs outside those bounding boxes. A bounding box associated with a patch can be split into T×T blocks, typically T=16.

T×T blocks containing 2D samples belonging to a patch may be considered as occupied blocks. Each occupied block of the canvas is represented by a particular pixel value (for example 1) in the occupancy map OM and each unoccupied block of the canvas is represented by another particular value, for example 0. Then, a pixel value of the occupancy map OM may indicate whether a T×T block of the canvas is occupied, that is contains 2D samples that belong to a patch.

In FIG. 3a, an occupied block is represented by a white block and light grey blocks represent unoccupied blocks. The image generation processes (steps 3300 and 3400) exploit the mapping of the at least one generated patch onto the 2D grid computed during step 3200, to store the geometry and texture of the input point cloud frame IPCF as images.

In step 3300, a geometry image generator GIG may generate at least one geometry image GI from the input point cloud frame IPCF, the occupancy map OM and the auxiliary patch information PI. The geometry image generator GIG may exploit the occupancy map information in order to detect (locate) the occupied blocks and thus the non-empty pixels in the geometry image GI.

A geometry image GI may represent the geometry of the input point cloud frame IPCF and may be a monochromatic image of W×H pixels represented, for example, in YUV420-8 bit format.

In order to better handle the case of multiple 3D samples being projected (mapped) to a same 2D sample of the projection plane (along a same projection direction (line)), multiple images, referred to as layers, may be generated. Thus, different depth values D1, . . . , Dn may be associated with a 2D sample of a patch and multiple geometry images may then be generated.

In V-PCC, 2D samples of a patch are projected onto two layers. A first layer, also called the near layer, may store, for example, the depth values D0 associated with the 2D samples with smaller depths. A second layer, referred to as the far layer, may store, for example, the depth values D1 associated with the 2D samples with larger depths. Alternatively, the second layer may store difference values between depth values D1 and D0. For example, the information stored by the second depth image may be within an interval [0, Δ] corresponding to depth values in the range [D0, D0+Δ], where Δ is a user-defined parameter that describes the surface thickness.

By this way, the second layer may contain significant contour-like high frequency features. Thus, it clearly appears that the second depth image may be difficult to code by using a legacy video coder and, therefore, the depth values may be poorly reconstructed from said decoded second depth image, which results on a poor quality of the geometry of the reconstructed point cloud frame.

According to an embodiment, the geometry image generating module GIG may code (derive) depth values associated with 2D samples of the first and second layers by using the auxiliary patch information PI.

In V-PCC, the location of a 3D sample in a patch with a corresponding connected component may be expressed in terms of depth δ(u, v), tangential shift s(u, v) and bi-tangential shift r(u, v) as follows:

$$\delta(u,v)=\delta 0+g(u,v)$$

$$s(u,v)=s0-u0+u$$

$$r(u,v)=r0-v0+v$$

where g(u, v) is the luma component of the geometry image, (u,v) is a pixel associated with the 3D sample on a projection plane, (δ0, s0, r0) is the 3D location of the corresponding patch of a connected component to which the 3D sample belongs and (u0, v0, u1, v1) are the coordinates in said projection plane defining a 2D bounding box encompassing the projection of the patch associated with said connected component.

Thus, a geometry image generating module GIG may code (derive) depth values associated with 2D samples of a layer (first or second or both) as a luma component g(u,v) given by: g(u,v)=δ(u, v)−δ0. It is noted that this relationship may be employed to reconstruct 3D sample locations (δ0, s0, r0) from a reconstructed geometry image g(u, v) with the accompanying auxiliary patch information P1.

According to an embodiment, a projection mode may be used to indicate if a first geometry image GI0 may store the depth values of the 2D samples of either the first or second layer and a second geometry image GI1 may store the depth values associated with the 2D samples of either the second or first layer.

For example, when a projection mode equals 0, then the first geometry image GI0 may store the depth values of 2D samples of the first layer and the second geometry image GI1 may store the depth values associated with 2D samples of the second layer. Reciprocally, when a projection mode equals 1, then the first geometry image GI0 may store the depth values of 2D samples of the second layer and the second geometry image GI1 may store the depth values associated with 2D samples of the first layer.

According to an embodiment, a frame projection mode may be used to indicate if a fixed projection mode is used for all the patches or if a variable projection mode is used in which each patch may use a different projection mode.

The projection mode and/or the frame projection mode may be transmitted as metadata.

A frame projection mode decision algorithm may be provided, for example, in section 2.2.1.3.1 of V-PCC.

According to an embodiment, when the frame projection indicates that a variable projection mode may be used, a patch projection mode may be used to indicate the appropriate mode to use to (de-)project a patch.

A patch projection mode may be transmitted as metadata and may be, possibly, an information included in the auxiliary patch information PI.

A patch projection mode decision algorithm is provided, for example in section 2.2.1.3.2 of V-PCC.

According to an embodiment of step 3300, the pixel value in a first geometry image, for example GI0, corresponding to a 2D sample (u,v) of a patch, may represent the depth value of at least one in-between 3D sample defined along a projection line corresponding to said 2D sample (u,v). More precisely, said in-between 3D samples reside along a projection line and share the same coordinates of the 2D sample (u,v) whose depth value D1 is coded in a second geometry image, for example GI1. Further, the said in-between 3D samples may have depth values between the depth value D0 and a depth value D1. A designated bit may be associated with each said in-between 3D samples which is set to 1 if the in-between 3D sample exists and 0 otherwise.

Figure 3B:
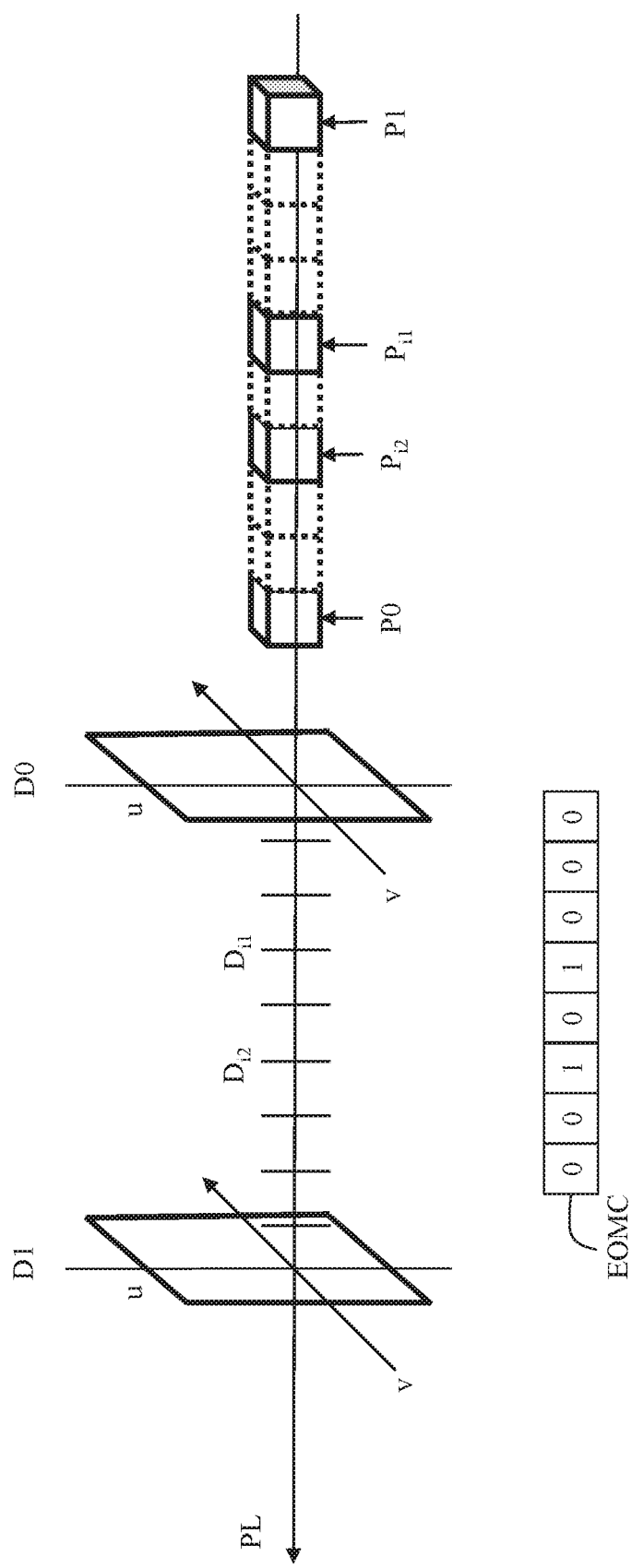
FIG. 3b illustrates an example of two in-between 3D samples located between two 3D samples along a projection line.

FIG. 3b illustrates an example of two in-between 3D samples $P_{i1}$ and $P_{i2}$ located between two 3D samples P0 and P1 along a projection line PL. The 3D samples P0 and P1 have respectively depth values equal to D0 and D1. The depth values $D_{i1}$ and $D_{i2}$ of respectively the two in-between 3D samples $P_{i1}$ and $P_{i2}$ are greater than D0 and lower than D1.

Then, all said designated bits along said projection line may be concatenated to form a codeword, denoted Enhanced-Occupancy map (EOM) codeword hereafter. As illustrated in FIG. 3b, assuming an EOM codeword of 8 bits of length, 2 bits equal 1 to indicate the location of the two 3D samples $P_{i1}$ and $P_{i2}$. Finally, all the EOM codewords may be packed in an image, for example, the occupancy map OM. In that case, at least one patch of the canvas may contain at least one EOM codeword. Such a patch is denoted reference patch and a block of a reference patch is denoted a EOM reference block. Thus, a pixel value of the occupancy map OM may equal to a first value, for example 0, to indicate an unoccupied block of the canvas, or another value, for example greater than 0, to indicate either a occupied block of the canvas, for example when D1−D0<=1, or to indicate a EOM reference block of the canvas when, for example D1−D0>1.

The locations of pixels in the occupancy map OM that indicates EOM reference blocks and the values of the bits of a EOM codeword that are obtained from the values of those pixels, indicate the 3D coordinates of the in-between 3D samples.

In step 3400, a texture image generator TIG may generate at least one texture image TI from the input point cloud frame IPCF, the occupancy map OM, the auxiliary patch information PI and a geometry of a reconstructed point cloud frame derived from at least one decoded geometry image DGI, output of a video decoder VDEC (step 4200 in FIG. 4).

A texture image TI may represent the texture of the input point cloud frame IPCF and may be an image of W×H pixels represented, for example, in YUV420-8 bit format.

The texture image generator TG may exploit the occupancy map information in order to detect (locate) the occupied blocks and thus the non-empty pixels in the texture image.

The texture image generator TIG may be adapted to generate and associate a texture image TI with each geometry image/layer DGI.

According to an embodiment, the texture image generator TIG may code (store) the texture (attribute) values T0 associated with 2D samples of the first layer as pixel values of a first texture image TI0 and the texture values T1 associated with the 2D samples of the second layer as pixel values of a second texture image TI1.

Alternatively, the texture image generating module TIG may code (store) the texture values T1 associated with 2D samples of the second layer as pixel values of the first texture image TI0 and the texture values D0 associated with the 2D samples of the first layer as pixel values of the second geometry image GI1.

For example, colors of 3D samples may be obtained as described in section 2.2.3, 2.2.4, 2.2.5, 2.2.8 or 2.5 of V-PCC.

The texture values of two 3D samples are stored in either the first or second texture images. But, the texture values of in-between 3D samples cannot be stored neither in this first texture image TI0 nor the second texture image TI1 because the locations of the projected in-between 3D samples correspond to occupied blocs that are already used for storing a texture value of another 3D sample (P0 or P1) as illustrated in FIG. 3b. The texture values of in-between 3D samples are thus stored in EOM texture blocks located elsewhere in either the first or second texture image in locations procedurally defined (section 9.4.5 of V-PCC). In brief, this process determines locations of unoccupied blocks in a texture image and stored the texture values associated with in-between 3D samples as pixel values of said unoccupied blocks of the texture image, denoted EOM texture blocks.

According to an embodiment, a padding process may be applied on the geometry and/or texture image. The padding process may be used to fill empty space between patches to generate a piecewise smooth image suited for video compression.

An image padding example is provided in sections 2.2.6 and 2.2.7 of V-PCC.

In step 3500, a video encoder VENC may encode the generated images/layers TI and GI.

In step 3600, an encoder OMENC may encode the occupancy map as an image as detailed, for example, in section 2.2.2 of V-PCC. Lossy or lossless encoding may be used.

According to an embodiment, the video encoder ENC and/or OMENC may be a HEVC-based encoder.

In step 3700, an encoder PIENC may encode the auxiliary patch information PI and possibly additional metadata such as the block size T, the width W and height H of the geometry/texture images.

According to an embodiment, the auxiliary patch information may be differentially encoded (as defined, for example in section 2.4.1 of V-PCC).

In step 3800, a multiplexer may be applied to the generated outputs of steps 3500, 3600 and 3700, and as a result these outputs may be multiplexed together so as to generate a bitstream representative of the base layer BL. It should be noted that the metadata information represents a small fraction of the overall bitstream. The bulk of the information is compressed using the video codecs.

FIG. 4 illustrates a schematic block diagram of an example of an image-based point cloud decoder 4000 in accordance with at least one of the present embodiments.

In step 4100, a de-multiplexer DMUX may applied to demutiplex the encoded information of the bitstream representative of the base layer BL.

In step 4200, a video decoder VDEC may decode encoded information to derive at least one decoded geometry image DGI and at least one decoded texture image DTI.

In step 4300, a decoder OMDEC may decode encoded information to derive a decoded occupancy map DOM.

According to an embodiment, the video decoder VDEC and/or OMDEC may be a HEVC-based decoder.

In step 4400, a decoder PIDEC may decode encoded information to derive auxiliary patch information DPI.

Possibly, metadata may also be derived from the bitstream BL.

In step 4500, a geometry generating module GGM may derive the geometry RG of a reconstructed point cloud frame IRPCF from the at least one decoded geometry image DGI, the decoded occupancy map DOM, the decoded auxiliary patch information DPI and possible additional metadata.

The geometry generating module GGM may exploit the decoded occupancy map information DOM in order to locate the non-empty pixels in the at least one decoded geometry image DGI.

Said non-empty pixels belong to either occupied blocks or EOM reference blocks depending on pixels values of the decoded occupancy information DOM and value of D1-D0 as explained above.

According to an embodiment of step 4500, the geometry generating module GGM may derive two of the 3D coordinates of in-between 3D samples from coordinates of non-empty pixels.

According to an embodiment of step 4500, when said non-empty pixels belong to said EOM reference block, the geometry generating module GGM may derive the third of the 3D coordinates of in-between 3D samples from the bit values of the EOM codewords.

For example, according to the example of FIG. 3b, the EOM codeword EOMC is used for determining the 3D coordinates of in-between 3D samples $P_{i1}$ and $P_{i2}$. The third coordinate of the in-between 3D sample $P_{i1}$ may be derived, for example, from D0 by $D_{i1}=D0+3$ and the third coordinate of the reconstructed 3D sample $P_{i2}$ may be derived, for example, from D0 by $D_{i2}=D0+5$. The offset value (3 or 5) is the number of intervals between D0 and D1 along the projection line.

According to an embodiment, when said non-empty pixels belong to an occupied block, the geometry generating module GGM may derive the 3D coordinates of reconstructed 3D samples from coordinates of non-empty pixels, values of said non-empty pixels of one of the at least one decoded geometry image DGI, the decoded auxiliary patch information, and possibly, from additional metadata.

The use of non-empty pixels is based on 2D pixel relationship with 3D samples. For example, with the said projection in V-PCC, the 3D coordinates of reconstructed 3D samples may be expressed in terms of depth $\delta(u, v)$, tangential shift $s(u, v)$ and bi-tangential shift $r(u, v)$ as follows:

$$\delta(u,v)=\delta 0+g(u,v)$$

$$s(u,v)=s0-u0+u$$

$$r(u,v)=r0-v0+v$$

where g(u, v) is the luma component of a decoded geometry image DGI, (u,v) is a pixel associated with a reconstructed 3D sample, ($\delta 0$, s0, r0) is the 3D location of a connected component to which the reconstructed 3D sample belongs and (u0, v0, u1, v1) are the coordinates in a projection plane defining a 2D bounding box encompassing the projection of a patch associate with said connected component.

In step 4600, a texture generating module TGM may derive the texture of the reconstructed point cloud frame IRPCF from the geometry RG and the at least one decoded texture image DTI.

According to an embodiment of step 4600, the texture generating module TGM may derive the texture of non-empty pixels that belong to a EOM reference block from a corresponding EOM texture block. The locations of a EOM texture blocks in a texture image are procedurally defined (section 9.4.5 of V-PCC)

According to an embodiment of step 4600, the texture generating module TGM may derive the texture of non-empty pixels that belong to an occupied block directly as pixel values of either the first or second texture image.

Figure 5:
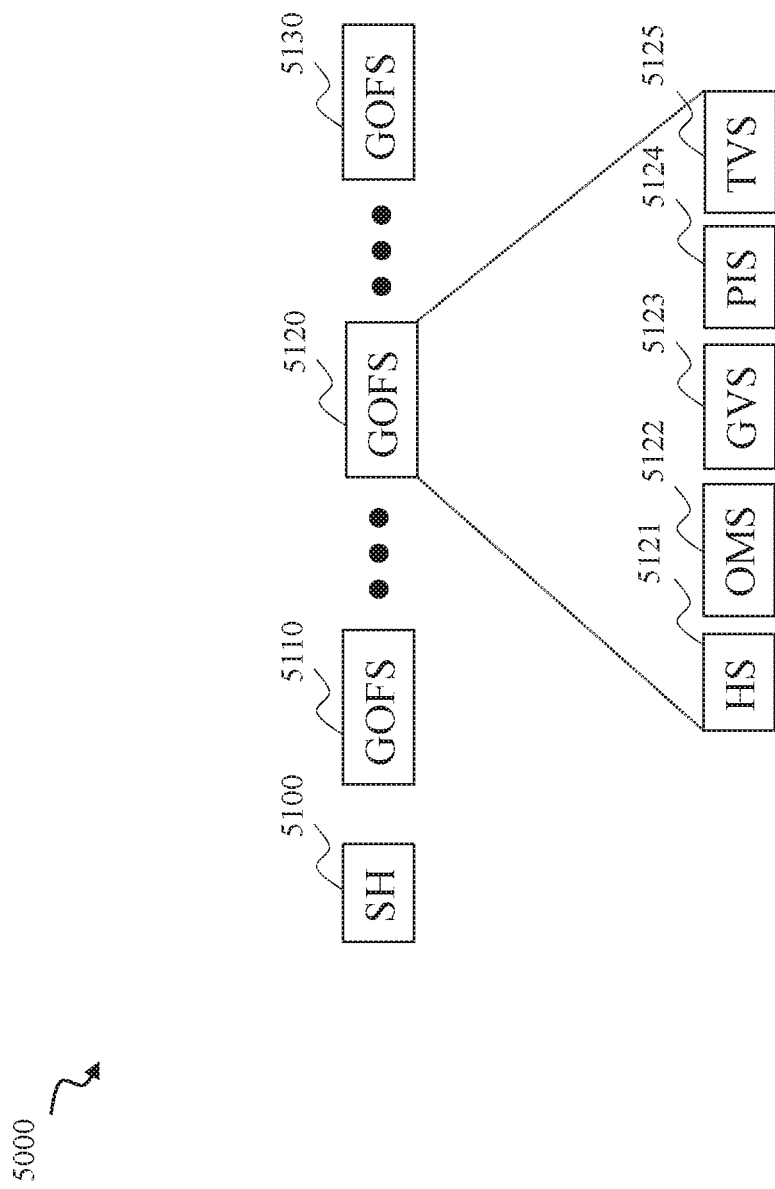
FIG. 5 illustrates schematically an example of syntax of a bitstream representative of a base layer BL in accordance with at least one of the present embodiments.

FIG. 5 illustrates schematically an example syntax of a bitstream representative of a base layer BL in accordance with at least one of the present embodiments.

The bitstream comprises a Bitstream Header SH and at least one Group Of Frame Stream GOFS.

A group of frame stream GOFS comprises a header HS, at least one syntax element OMS representative of an occupancy map OM, at least one syntax element GVS representative of at least one geometry image (or video), at least one syntax element TVS representative of at least one texture image (or video) and at least one syntax element PIS representative of auxiliary patch information and other additional metadata.

In a variant, a group of frame stream GOFS comprises at least one frame stream.

Figure 6:
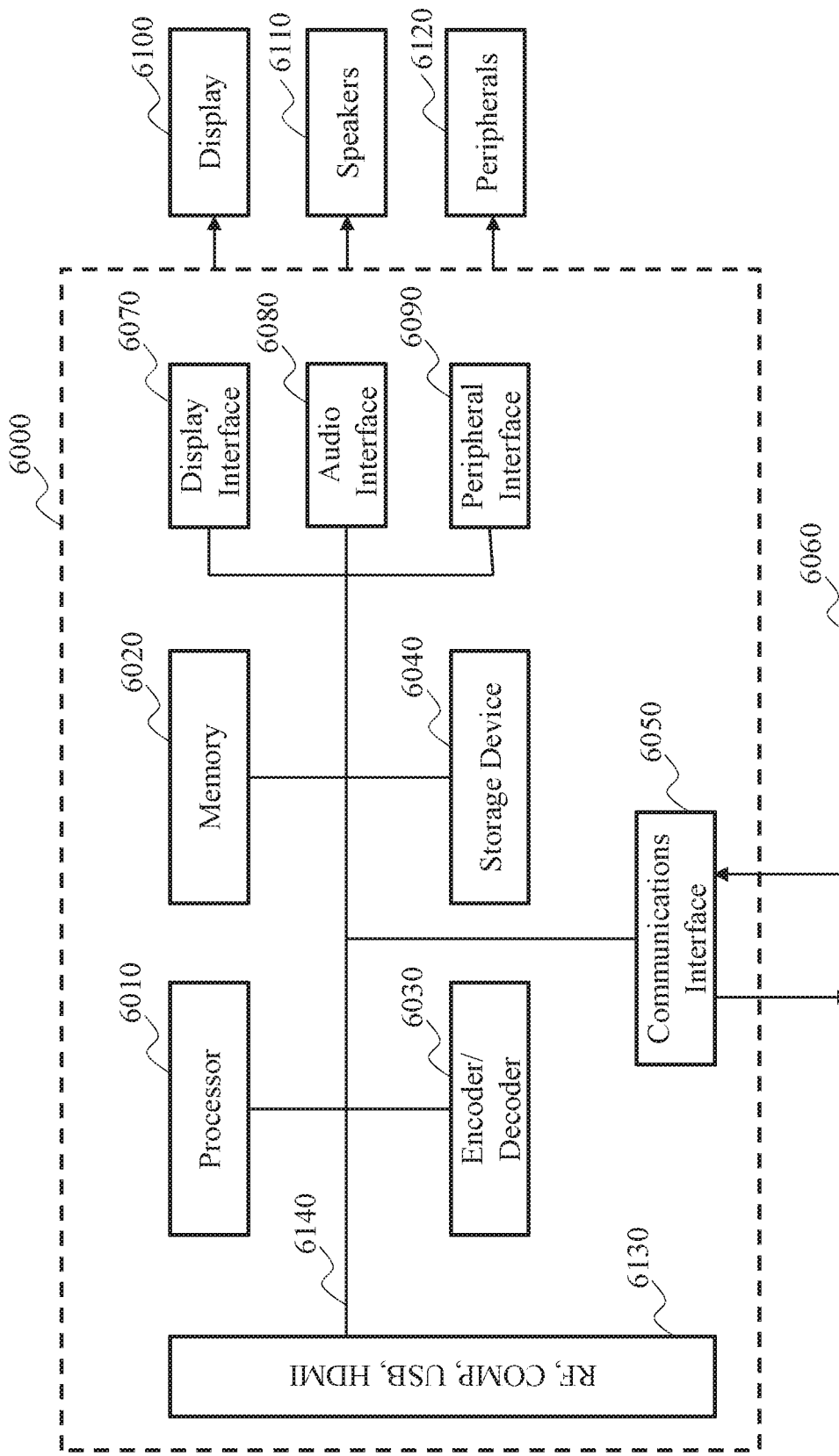
FIG. 6 illustrates a schematic block diagram of an example of a system in which various aspects and embodiments are implemented.

FIG. 6 shows a schematic block diagram illustrating an example of a system in which various aspects and embodiments are implemented.

System 6000 may be embodied as one or more devices including the various components described below and is configured to perform one or more of the aspects described in this document. Examples of equipment that may form all or part of the system 6000 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 6000, singly or in combination, may be embodied in a single integrated circuit, multiple ICs, and/or discrete components. For example, in at least one embodiment, the processing and encoder/decoder elements of system 6000 may be distributed across multiple ICs and/or discrete components. In various embodiments, the system 6000 may be communicatively coupled to other similar systems, or to other electronic devices, via, for example, a communications bus or through dedicated input and/or output ports. In various embodiments, the system 6000 may be configured to implement one or more of the aspects described in this document.

The system 6000 may include at least one processor 6010 configured to execute instructions loaded therein for implementing, for example, the various aspects described in this document. Processor 6010 may include embedded memory, input output interface, and various other circuitries as known in the art. The system 6000 may include at least one memory 6020 (for example a volatile memory device and/or a non-volatile memory device). System 6000 may include a storage device 6040, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 6040 may include an internal storage device, an attached storage device, and/or a network accessible storage device, as non-limiting examples.

The system 6000 may include an encoder/decoder module 6030 configured, for example, to process data to provide encoded data or decoded data, and the encoder/decoder module 6030 may include its own processor and memory. The encoder/decoder module 6030 may represent module(s) that may be included in a device to perform the encoding and/or decoding functions. As is known, a device may include one or both of the encoding and decoding modules. Additionally, encoder/decoder module 6030 may be implemented as a separate element of system 6000 or may be incorporated within processor 6010 as a combination of hardware and software as known to those skilled in the art.

Program code to be loaded onto processor 6010 or encoder/decoder 6030 to perform the various aspects described in this document may be stored in storage device 6040 and subsequently loaded onto memory 6020 for execution by processor 6010. In accordance with various embodiments, one or more of processor 6010, memory 6020, storage device 6040, and encoder/decoder module 6030 may store one or more of various items during the performance of the processes described in this document. Such stored items may include, but are not limited to, a point cloud frame, encoded/decoded geometry/texture videos/images or portions of the encoded/decoded geometry/texture video/ images, a bitstream, matrices, variables, and intermediate or final results from the processing of equations, formulas, operations, and operational logic.

In several embodiments, memory inside of the processor 6010 and/or the encoder/decoder module 6030 may be used to store instructions and to provide working memory for processing that may be performed during encoding or decoding.

In other embodiments, however, a memory external to the processing device (for example, the processing device may be either the processor 6010 or the encoder/decoder module 6030) may be used for one or more of these functions. The external memory may be the memory 6020 and/or the storage device 6040, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), or WC (Versatile Video Coding).

The input to the elements of system 6000 may be provided through various input devices as indicated in block 6130. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 6130 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 6000 to other electronic devices across USB and/or HDMI connections. It is to be understood that various aspects of input processing, for example, Reed-Solomon error correction, may be implemented, for example, within a separate input processing IC or within processor 6010 as necessary. Similarly, aspects of USB or HDMI interface processing may be implemented within separate interface ICs or within processor 6010 as necessary. The demodulated, error corrected, and demultiplexed stream may be provided to various processing elements, including, for example, processor 6010, and encoder/decoder 6030 operating in combination with the memory and storage elements to process the data stream as necessary for presentation on an output device.

Various elements of system 6000 may be provided within an integrated housing. Within the integrated housing, the various elements may be interconnected and transmit data therebetween using suitable connection arrangement 6140, for example, an internal bus as known in the art, including the I2C bus, wiring, and printed circuit boards.

The system 6000 may include communication interface 6050 that enables communication with other devices via communication channel 6060. The communication interface 6050 may include, but is not limited to, a transceiver configured to transmit and to receive data over communication channel 6060. The communication interface 6050 may include, but is not limited to, a modem or network card and the communication channel 6060 may be implemented, for example, within a wired and/or a wireless medium.

Data may be streamed to the system 6000, in various embodiments, using a Wi-Fi network such as IEEE 802.11. The Wi-Fi signal of these embodiments may be received over the communications channel 6060 and the communications interface 6050 which are adapted for Wi-Fi communications. The communications channel 6060 of these embodiments may be typically connected to an access point or router that provides access to outside networks including the Internet for allowing streaming applications and other over-the-top communications.

Other embodiments may provide streamed data to the system 6000 using a set-top box that delivers the data over the HDMI connection of the input block 6130.

Still other embodiments may provide streamed data to the system 6000 using the RF connection of the input block 6130.

It is to be appreciated that signaling may be accomplished in a variety of ways. For example, one or more syntax elements, flags, and so forth may be used to signal information to a corresponding decoder in various embodiments.

The system 6000 may provide an output signal to various output devices, including a display 6100, speakers 6110, and other peripheral devices 6120. The other peripheral devices 6120 may include, in various examples of embodiments, one or more of a stand-alone DVR, a disk player, a stereo system, a lighting system, and other devices that provide a function based on the output of the system 3000.

In various embodiments, control signals may be communicated between the system 6000 and the display 6100, speakers 6110, or other peripheral devices 6120 using signaling such as AV.Link (AudioNideo Link), CEC (Consumer Electronics Control), or other communications protocols that enable device-to-device control with or without user intervention.

The output devices may be communicatively coupled to system 6000 via dedicated connections through respective interfaces 6070, 6080, and 6090.

Alternatively, the output devices may be connected to system 6000 using the communications channel 6060 via the communications interface 6050. The display 6100 and speakers 6110 may be integrated in a single unit with the other components of system 6000 in an electronic device such as, for example, a television.

In various embodiments, the display interface 6070 may include a display driver, such as, for example, a timing controller (T Con) chip.

The display 6100 and speaker 6110 may alternatively be separate from one or more of the other components, for example, if the RF portion of input 6130 is part of a separate set-top box. In various embodiments in which the display 6100 and speakers 6110 may be external components, the output signal may be provided via dedicated output connections, including, for example, HDMI ports, USB ports, or COMP outputs.

Retrieving the texture values of in-between 3D samples from EOM texture blocks, as defined in V-PCC, requires no additional syntax to indicate the locations of said in-between 3D samples because those locations are derived from EOM codewords of EOM reference blocks of the occupancy map OM and to indicate the locations of the EOM texture blocks that are defined by sequentially processing. But, random accessing the texture values of particular in-between 3D samples is not possible because all the EOM texture blocks shall be then systematically processed to determine the location of a particular EOM texture block.

Additionally, embedding EOM texture blocks in between patches of a texture image may reduce the compression efficiency of said texture image because the content of said texture image may then have low spatial correlations (redundancies).

According to a general aspect of at least one embodiment, there is provided a method comprising signaling at least one EOM (Enhanced Occupancy Map) texture patch representing the texture value of at least one in-between 3D sample.

Signaling EOM texture patches allows random (direct, quick) access to the texture values of particular in-between 3D samples. In other words, its possible to independently decode the texture corresponding to in-between 3D samples reconstructed from EOM codewords. This allows implementing additional features like spatial scalability or parallel decoding.

Figures 7, 8A:
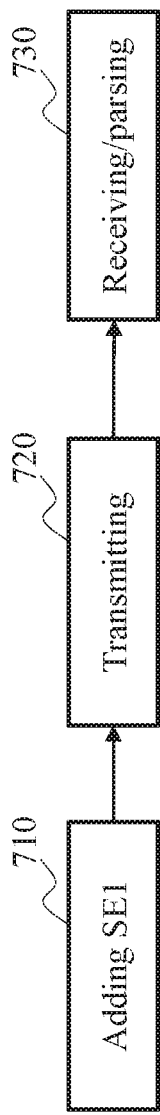

FIG. 7 illustrates an example of a method for signaling at least one EOM texture patch in accordance with at least one of the present embodiments.

In step 710, a module may add, in a bitstream, at least one syntax element SE1 representing the 2D location of an EOM texture patch (indexed by patchIndex) in the canvas of a point cloud frame (indexed by frmidx), and the size (height, width) of said EOM texture patch.

An example of a canvas is illustrated in FIG. 3*a*.

In step 720, the bitstream may be transmitted.

In step 730, a module may retrieve (read) from a bitstream (received bitstream) at least one syntax element SE1 and may extract from said at least one syntax element SE1, the 2D location of an EOM texture patch in the canvas of a point cloud frame, and the size (height, width) of said EOM texture patch.

According to an embodiment, the 2D location of an EOM texture patch (indexed by patchIndex) in the canvas may be signaled by an horizontal coordinate etpdu_2d_shift_u and a vertical coordinate etpdu_2d_shift_v defined if a 2D coordinates system of the canvas.

This embodiment provides flexible placing of a EOM texture patch in the canvas.

According to an embodiment, the size (height, width) of the EOM texture patch (indexed by patchIndex) may be signaled by etpdu_2d_delta_sIze_u and etpdu_2d_delta_size_v that represents respectively the height and the width of the EOM texture patch.

This embodiment allows adapting the size of an EOM texture patch.

According to an embodiment of step 710, illustrated in FIG. 8*a*, a syntax element SE1 may also be an element etpdu_points signaling the number of 2D samples of a patch (indexed by patchIndex) of the canvas.

This embodiment is advantageous because it requires a low amount of data to be transmitted.

However, the number of 2D samples of a patch is signaled even if this patch is not a EOM texture patch, that is even if this patch does not carry any texture values of in-between 3D samples (in which case etpdu_points is set to 0).

Also, this embodiment requires that patch information in the EOM texture patch be in the same order as the patches in the current point cloud frame.

Figure 9A:
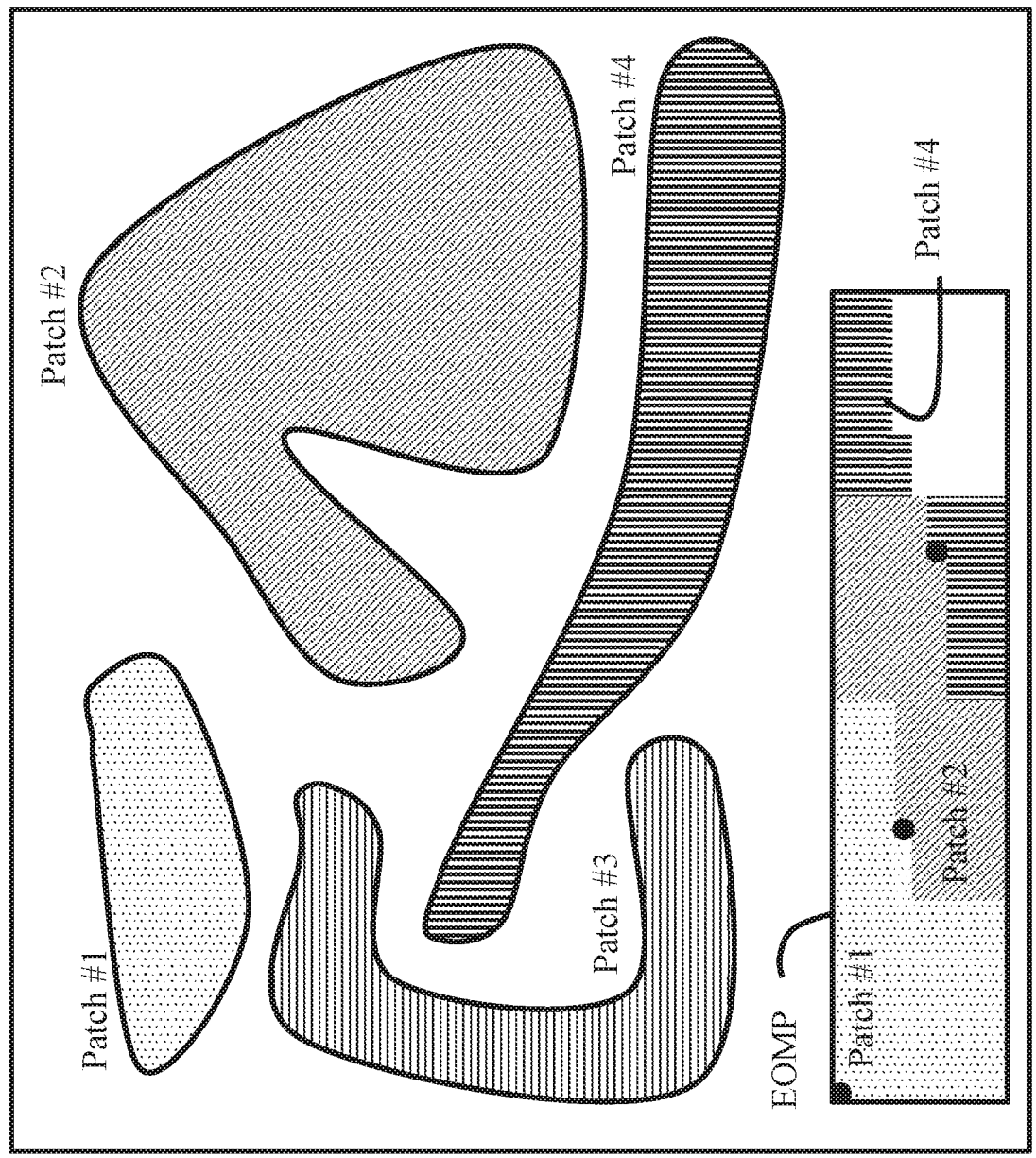
FIG. 9a-c illustrate examples canvas in accordance with at least one embodiment of step 710.

FIG. 9*a* illustrates an example of a texture image with a canvas comprising four texture patches and a single EOM texture patch EOMP in accordance with said embodiment of step 710.

Each of the texture patches #1, #2, #3 and #4 stores texture values of 3D samples of the point cloud and the EOM texture patch EOMP stores texture values of in-between samples relative to texture patches #1, #2 and #4. The texture value of at least one in-between 3D sample relative to the texture patch #1 is/are first added from the top left corner of the EOM texture patch EOMP, followed by the texture value(s) of at least one in-between 3D sample relative to the texture patch #2, followed by the texture value(s) of at least one in-between 3D sample relative to the texture patch #4.

This embodiment does not support multiple EOM texture patches.

This embodiment does not allow 'gaps' between the texture values of in-between 3D samples of two successive patches as illustrated, for example, in FIG. 9*a*.

According to an embodiment of step 710, illustrated in FIG. 8*b*, a syntax element SE1 may also be an element etpdu_patch_count representing the number of reference patches in the EOM texture patch, another syntax element SE1 may also be an element etpdu_ref_index representing an index of a 'p'-th reference patch and another syntax element SE1 may also be an element etpdu_offset representing an offset (in pixels) to determine a starting location of a 'p'-th (current) reference patch (following a previous reference patch 'p−1').

Figure 9B:
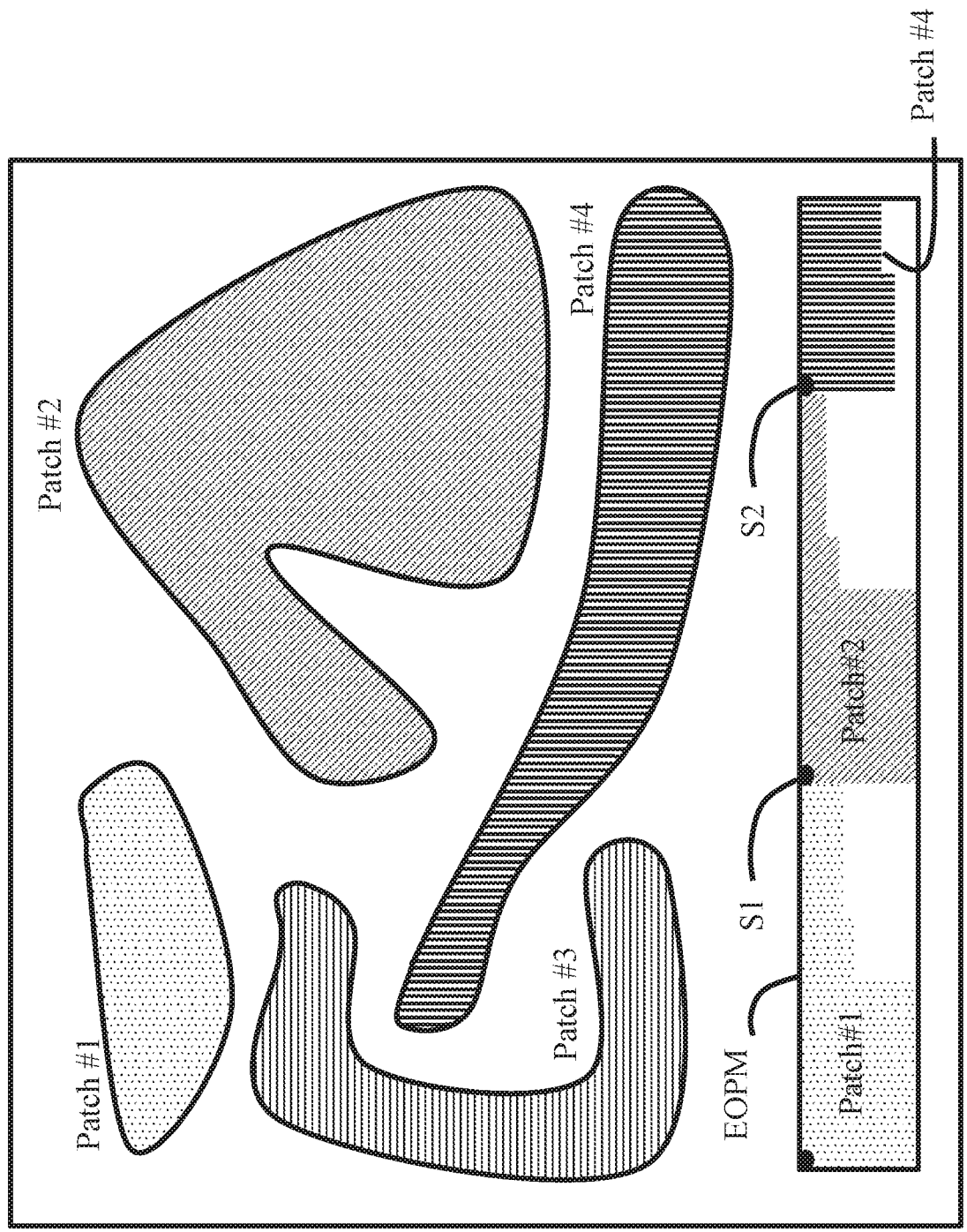

FIG. 9*b* illustrates an example of a texture image with a canvas comprising four texture patches and a single EOM texture patch EOMP in accordance with said embodiment of step 710.

Each of the texture patches #1, #2, #3 and #4 stores texture values of 3D samples of the point cloud and the EOM texture patch EOMP stores texture values of in-between samples relative to texture patches #1, #2 and #4. The texture value of at least one in-between 3D sample relative to the texture patch #1 is/are first added from the top left corner of the EOM texture patch EOMP. Next, a starting location S1 is determined for the texture patch #2 from an element etpdu_offset relative to said texture patch. The texture value(s) of at least one in-between 3D sample relative to the texture patch #2 is then stored. Next, a starting location S2 is determined for the texture patch #4 from an element etpdu_offset relative to said texture patch. The texture value(s) of at least one in-between 3D sample relative to the texture patch #4 is then stored.

Figure 9C:
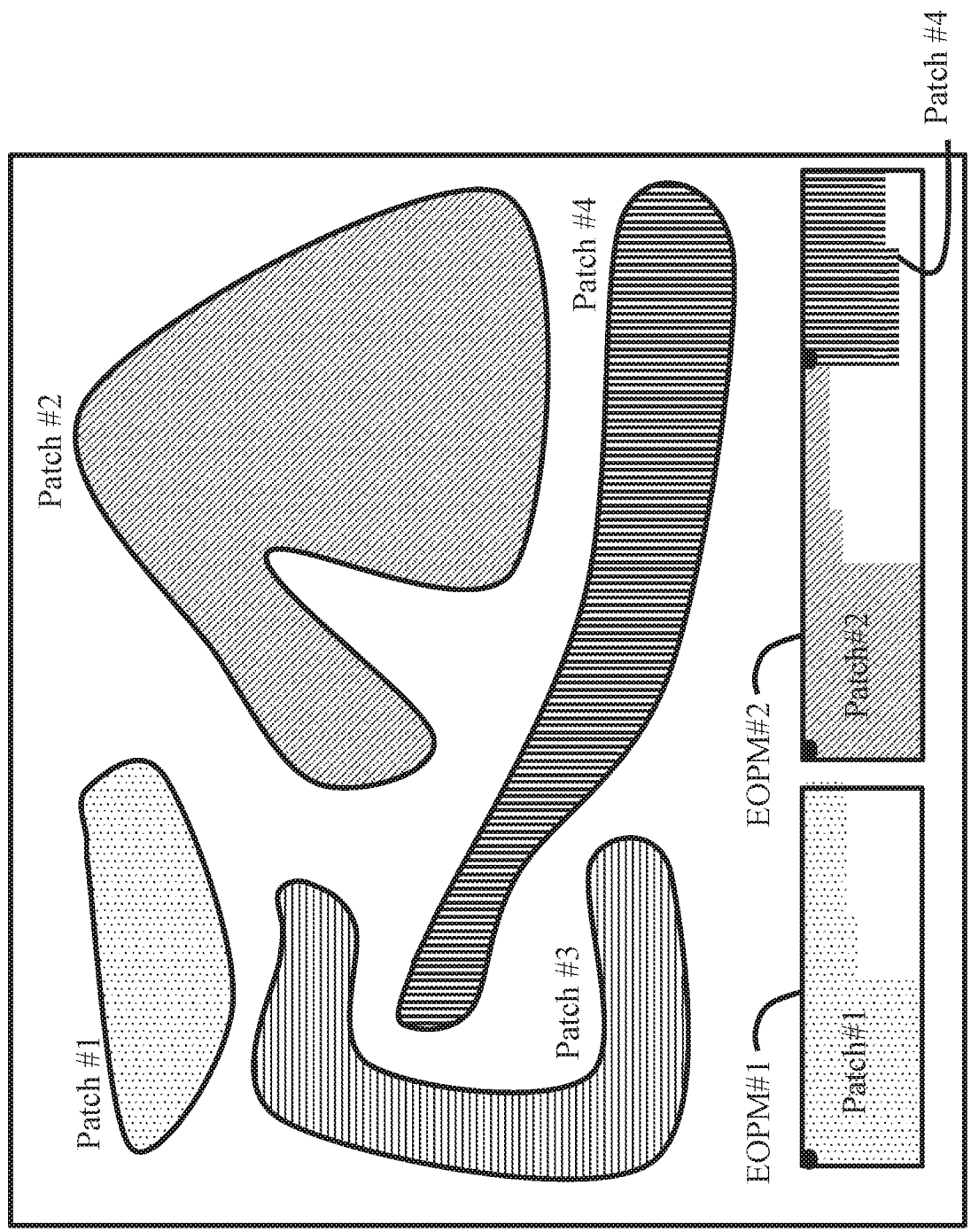

This embodiment provides a very flexible solution and may support multiple EOM texture patches as illustrated in FIG. 9c, but requires more data to be transmitted compared to the previous embodiment.

According to an embodiment of step 710, illustrated in FIG. 8c, a syntax element SE1 may also be an element etpdu_patch_count representing the number of reference patches in the EOM texture patch, and an element etpdu_offset representing an offset (in pixels) to determine a starting location of a 'p'-th (current) reference patch (following a previous reference patch 'p−1').

Compared to the embodiments illustrated in FIG. 8a-b, the embodiment illustrated in FIG. 8c adds a little bit of complexity in the parsing of the syntax ('if' statement), but provides a level flexibility very close to the embodiment as illustrated in FIG. 8b (only the order of patches cannot be changed).

The embodiment illustrated in FIG. 8c supports multiple EOM texture reference patches, but it requires that the indices of EOM texture reference patches follows the same order as the indices of patches of the point cloud across all EOM texture patches; i.e. if there are N regular patches, the texture of the first m1 patches should be in the first EOM texture patch, the texture of the next m2 patches should be in the next EOM texture patch, and so on, where the sum of m1 . . . mX should be equal to or less than N.

According to an embodiment of step 710, illustrated in FIG. 8d, a syntax element SE1 may also be an element etpdu_mode indicating a particular syntax representing a EOM texture patch as defined by one of the embodiments of step 710 illustrated in FIG. 8a-c.

This embodiment allows combining multiple variants into a single syntax SE1.

According to an embodiment of step 710, the module may also add at least one other syntax element SE2 in the bitstream to signal said at least one syntax element SE1 at different levels of whole syntax representing the point cloud frame.

According to an embodiment of step 710, at least one syntax element SE1 may be signalled at the sequence level.

For example, said at least one syntax element SE1 may be signalled in the syntax element sequence_parameter_set( ) as defined in V-PCC.

According to a variant of said embodiment of step 710, illustrated in FIG. 10, a second syntax element SE2 may be a syntax element sps_enhanced_occupancy_map_texture_patch_present_flag of the Sequence Parameter set syntax as defined in V-PCC.

The syntax element sps_enhanced_occupancy_map_texture_patch_present_flag indicates whether a EOM texture patch exists for a sequence of point cloud frames.

When a syntax element sps_enhanced_occupancy_map_texture_patch_present_flag equals 0, the EOM texture patch does not exist. When the syntax element sps_enhanced_occupancy_map_texture_patch_present_flag equals 1, the EOM texture patch exist.

Said syntax element sps_enhanced_occupancy_map_texture_patch_present_flag may also be combined with a syntax element sps_enhanced_occupancy_map_depth_for_enabled_flag, as defined in V-PCC, to indicate if an existing EOM texture patch is present in a texture image TI0 or TI1 or if said existing EOM texture patch is present in another bitstream.

According to a variant of said embodiment of step 710, the syntax element sequence_parameter_set( ) may optionally use a different video for the EOM texture patch; that is a pcm patch (section 7.3.33 and 7.4.33 in V-PCC) and the EOM texture patch would be in different texture images (video bitstreams).

While this increases the number of sub-bitstreams in a global V-PCC bitstream, it allows better adjusting the encoding parameters of each and, mainly, provides better scalability features—e.g. no need to decode the EOM texture patch if only the texture of the pcm patch is required, and vice versa.

FIG. 11 illustrates an example of syntax table of the syntax element sequence_parameter_set( ) in accordance with said variant of said embodiment of step 710.

The syntax element sps_eom_texture_patch_separate_video_present_flag indicates explicitly whether a separate video is used for a EOM texture patch.

According to an embodiment of step 710, as illustrated in FIGS. 12 and 14, at least one syntax element SE1 is signalled at the frame level.

For example, said at least one syntax element SE1 is signalled in the syntax element patch_frame_data_unit( ) as defined in V-PCC.

According to a variant of said embodiment of step 710, illustrated in FIG. 12, a second syntax element SE2 may be a syntax element sps_enhanced_occupancy_map_texture_patch_present_flag that signals a particular syntax for representing a EOM texture patch.

The syntax element sps_enhanced_occupancy_map_texture_patch_present_flag indicates whether a EOM texture patch is present in the bitstream.

When a syntax element sps_enhanced_occupancy_map_texture_patch_present_flag equals 0, the EOM texture patch is not present. When the syntax element sps_enhanced_occupancy_map_texture_patch_present_flag equals 1, the EOM texture patch is present and data relative to the EOM texture patch are thus retrieved from the bitstream thanks to a function patch_information_data(·) as defined in V-PCC.

Said function depends on a patch mode as defined in tables of FIG. 13.

The patch mode I_EOMT (for intra frames) identifies that the patch is an enhanced occupancy map texture patch in an intra frame as defined in V-PCC and the patch mode P_EOMT (for inter, or predicted frames) identifies that the patch is an enhanced occupancy map texture patch in an inter frame as defined in V-PCC.

According to a variant of said embodiment of step 710, illustrated in FIG. 14, a second element SE2 may also be a syntax element pfdu_eom_texture_patch_count that indicates how many EOM texture patches exists. The number of EOM texture patches must be equal to or less than pfdu_patch_count_minus1+1.

Said variant is illustrated in FIG. 14. A loop over the number of EOM texture patch runs for obtained data relative of each of the EOM texture patch.

Using multiple EOM texture patches requires slightly more bitrate than using a single patch but allows for a more compact patch packing (several, small EOM texture patches are easier to fit in the texture canvas than a single big EOM texture patch).

According to an embodiment of step 710, illustrated in FIG. 15, a second element SE2 may also be a syntax element patch_mode that indicates the type of patch; e.g. regular intra patch, I_INTRA or P_INTRA.

FIG. 16 illustrates a block diagram of a method for coding the texture values of in-between 3D samples in accordance with at least one of the present embodiments.

In step 1610, a module may analyse an orthogonal projection of a point cloud frame PCF onto a projection plane to derive a texture value TV of at least one in-between 3D sample.

In step 1620, a module may map said at least one texture value TV into at least one EOM texture patch EOMP.

In step 1630, a module may pack said at least one EOM texture patch EOMTP into a texture image.

For example, steps 1610 and 1620 may be a part of step 3100 in which the module PGM may generate an additional patch per EOM texture patch EOMTP. Step 1630 may then be a part of steps 3200 and 3400. In step 3200, said at least one additional patch is packed together with the other generated patches in the canvas, and in step 3400, the texture image generator TG may code (map) the texture value TV in at least one EOM texture patch EOMTP that is the co-located of said at least one additional patch in the texture image.

In step 1640, a module may signal, in a bitstream, said at least one packed EOM texture patch EOMTP as described in relation with FIG. 7.

For example, step 1640 may be a part of the step 3700 in which the encoder PIENC may encode at least one syntax element SE1, and possibly SE2, representing said at least one EOM texture patch EOMTP following the syntax described in relation with FIGS. 10-15.

According to an embodiment of step 1620, mapping the texture values TV into at least one EOM texture patch EOMTP comprises two sub-steps 1621 and 1622 as illustrated in FIG. 16.

In sub-step 1621, the module may check if a patch of the occupancy map OM of the point cloud frame contains a EOM reference block EOMB.

In step 1622, the module may embed the texture value TV of at least one in-between 3D sample of each EOM reference block into at least one EOM texture patch EOPM. Each EOM texture patch is thus associated with at least one EOM reference block.

Basically, for each path comprising at least one EOM reference block, a sorted list of texture values TV is formed, and said ordered list is then rasterized into at least one EOM texture patch.

According to an embodiment of step 1622, the sorted list of texture values TV may be formed by sequentially scanning the pixels of a patch of the canvas of the occupancy map OM. If a pixel value corresponds to an EOM codeword, then the texture value TV of the corresponding in-between 3D sample is concatenated to the end of the ordered list.

Examples of scanning are raster scanning, Z-order scanning and 2D-Hilbert curve. Raster-scanning may can the EOM texture patch left to right and top to bottom. A block-based scan may also be used or a per-block scanning of the EOM texture patch, where is block is raster-scanned.

This embodiment of step 1622 is the most straightforward approach because it does not require scanning the 3D space.

According to an embodiment of step 1622, the sorted list of texture values TV may be formed as follows:

First, all in-between 3D samples of a patch are reconstructed. Then, scanning the 3D space using a 3D curve, the texture values DV of the in-between 3D samples of the patch are concatenated to the list in the order found in the 3D curve.

Examples of 3D curves are the Hilbert curve, the Z-order curve or any locality-preserving curve would be appropriate.

This embodiment is more complex due to the 3D scanning but increases the correlation between neighbouring samples of the EOM texture patch, increasing coding efficiency.

According to an embodiment of step 1622, the sorted list of texture values TV may be formed as follows:

First, all in-between 3D samples of a patch are reconstructed and represented by means of a tree. The tree is created by first mapping all in-between samples to 3D space, then recursively partitioning the 3D space in e.g. octants (to form an octree) or halves (to form a KD tree). Then, sorted list of texture values TV is formed by traversing such tree.

Example of trees are octrees and KD-trees. Traversing can be done depth-first or breadth-first.

This embodiment is a trade-off between 2D and 3D scanning.

According to an embodiment of step 710, a syntax element SE1 may also be an element indicating how the list of texture values is sorted.

According to an embodiment of step 710, a syntax element SE1 may also be an element indicating how the type of rasterization is used.

According to an embodiment, the sorting and the rasterizing types are fixed and known by both the encoder and decoder.

Figure 17:
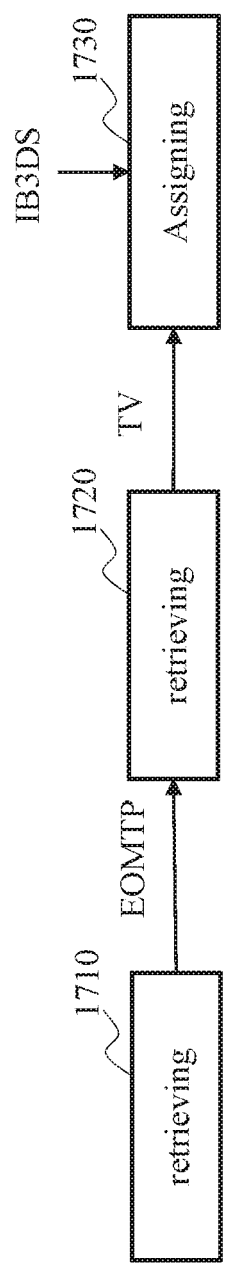
FIG. 17 illustrates a block diagram of a method for decoding the texture values of in-between 3D samples in accordance with at least one of the present embodiments.

FIG. 17 illustrates a block diagram of a method for decoding the texture values of in-between 3D samples in accordance with at least one of the present embodiments.

In step 1710, a module may derive at least one EOM texture patch EOMTP from a bitstream when said least one EOM texture patch EOMTP is signaled according to a method described in relation with FIG. 7.

For example, step 1710 is a part of step 4400 in which the decoded PIDEC may decode at least one EOM texture patch EOMTP information from at least one syntax element SE1, and possibly SE2, following the syntax described in relation with FIGS. 10-15.

In step 1720, a module may derive a texture value TV from said at least one EOM texture patch EOMTP.

In step 1730, a module may assign at least one texture value to at least one in-between 3D sample.

For example, step 1720 may be a part of step 4600 in which the texture generating module TGM may assign the texture value TV to at least one in-between 3D sample.

According to an embodiment of step 1720, deriving texture values TV from a EOM texture patch EOMTP is a modification of step 6 of the reconstruction process as described in section 9.4.5 of V-PCC.

More precisely, in sub-step 1721, the (u,v) coordinates of a first pixel of a reference patch in an EOM texture patch is determined. Said pixel value provides a texture value TV to a first in-between 3D sample. Next, in sub-step 1722, the texture values TV for at least one following in-between 3D samples are retrieved from the (u,v) coordinates of said first pixel.

The description of these sub-steps is provided assuming the richer syntax for the EOM texture patch as illustrated in FIG. 8b. But other alternative embodiments of these sub-steps relative to other syntax of the EOM texture patch as described above may also be derived.

In the following, the bitstream is assumed to have been parsed to decode the syntax of EOM texture patches in a point cloud frame (with index frameIdx). pfdu_eom_texture_patch_count refers to the number of EOM texture patches in the point cloud frame frameIdx. A point belonging to patch patchIdx in frame frameIdx, such point being the first intermediate point in decoding order of the patch patchIdx.

According to an embodiment of sub-step 1721, the (u,v) coordinates of a first pixel of a reference patch in an EOM texture patch are computed as follows:

Scanning EOM texture patches until the current index p equal a targeted patch index patchIdx; and
Initializing the coordinates (u,v) to the starting location of a current patch (current p) by hep of offset (etpdu_2d_shift_u and etpdu_2d_shift_v).

Here below is a pseudo-code of an algorithm implementing this embodiment.

```
// scan EOM texture patches until the patch index patchIdx is found
for( p = pfdu_patch_count_minus1+1; p <
pfdu_patch_count_minus1 + 1 +
pfdu_eom_texture_patch_count; p++ ) {
    // initialize (u,v) coordinates to top-left corner of OEM texture
    patch p
    u = etpdu_2d_shift_u[ frmIdx ][ p ]
    v = etpdu_2d_shift_v[ frmIdx ][ p ]
    // go thru all reference patches in current OEM texture
    // patch until the patch index patchIdx is found; and,
    // update coordinates with each reference patch found
    for( r = 0; r < etpdu_patch_count[ frmIdx ][ p ]; r++ ) {
        // if appropriate reference patch found
        if( etpdu_ref_index[ frmIdx ][ p ][ r ] == patchIdx )
            // end search. u,v values are final
            end
        else
            // otherwise, update coordinates to next reference
            patch
            coordinate_advance_raster (u, v,
                etpdu_points[ frmIdx ][ p ][ r ] +
                etpdu_offset[ frmIdx ][ p ][ r ])
    }
}
```

Depending on the embodiment used for the EOM texture patch syntax, some of the above parameters may be set to their default values.

For instance:
If there is no syntax element for the offset, then set etpdu_offset[frmIdx][p][r]=0 in the algorithm above.
If there's no syntax element for the reference patch count, pfdu_eom_texture_patch_count, then set pfdu_eom_texture_patch_count[frmIdx][p] to pfdu_patch_count_minus1+1.

According to an embodiment of sub-step 1722, the texture values TV for at least one following in-between 3D samples are retrieved from the (u,v) coordinates of said first pixel according to a scanning of the reference patch having a first point with the (u,v) coordinates of said first pixel (step 1721).

For example, this scanning may be done by a function coordinate_advance_raster (u, v, n) that advances n positions the (u,v) coordinate following a given raster scan order (e.g. one of the rasterization modes listed in V-PCC) and the dimensions on the EOM texture patch.

Figure 18:
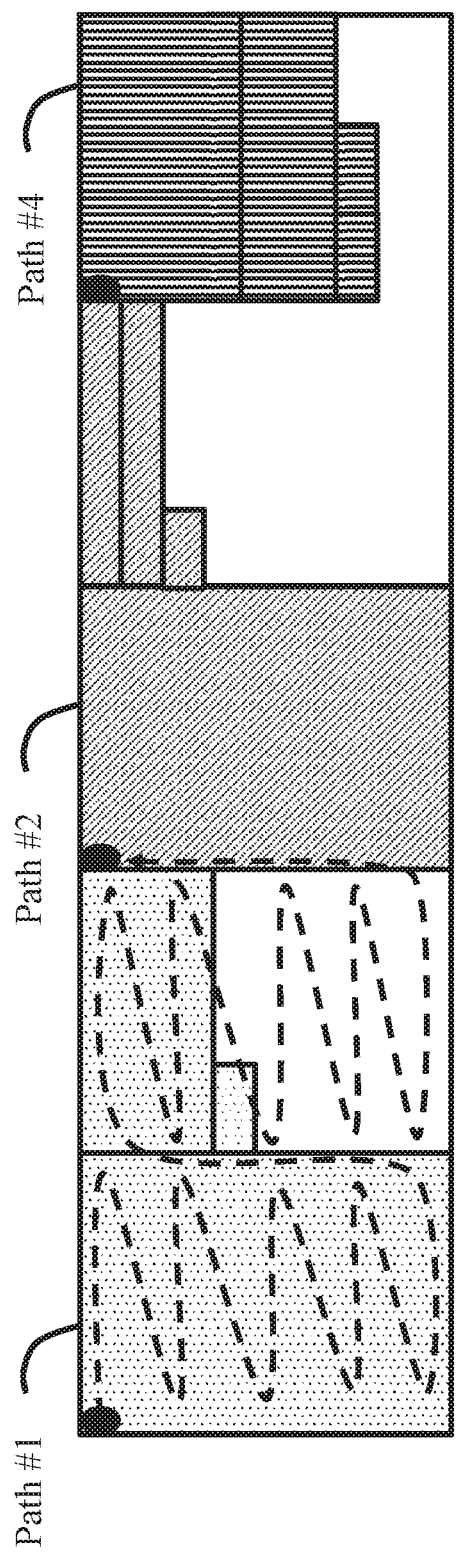
FIG. 18 illustrates an example of per block raster scan order.

A typical raster scanning is illustrated in FIG. 18.

In FIG. 1-18, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 6010 or by hardware, or by a combination of hardware and software. As a non-limiting example, the embodiments may be also implemented by one or more integrated circuits. The memory 6020 may be of any type appropriate to the technical environment and may be implemented using any appropriate data storage technology, such as optical memory devices, magnetic memory devices, semiconductor-based memory devices, fixed memory, and removable memory, as non-limiting examples. The processor 6010 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context dearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "AB", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one embodiment" or "an embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one embodiment" or "in an embodiment" or "in one implementation" or "in an implementation", as well any other variations, appearing in various places throughout this application are not necessarily all referring to the same embodiment.

Similarly, reference herein to "in accordance with an embodiment/example/implementation" or "in an embodiment/example/implementation", as well as other variations thereof, is frequently used to convey that a particular feature, structure, or characteristic (described in connection with the embodiment/example/implementation) may be included in at least one embodiment/example/implementation. Thus, the appearances of the expression "in accordance with an embodiment/example/implementation" or "in an embodiment/example/implementation" in various places in the specification are not necessarily all referring to the same embodiment/example/implementation, nor are separate or alternative embodiment/examples/implementation necessarily mutually exclusive of other embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure. is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by an image-based decoder.

As further examples, in one embodiment "decoding" may refer only to entropy decoding, in another embodiment "decoding" may refer only to differential decoding, and in another embodiment "decoding" may refer to a combination of entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input point cloud frame in order to produce an encoded bitstream. In various embodiments, such processes include one or more of the processes typically performed by an image-based decoder.

As further examples, in one embodiment "encoding" may refer only to entropy encoding, in another embodiment "encoding" may refer only to differential encoding, and in another embodiment "encoding" may refer to a combination of differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Note that the syntax elements as used herein, for example, etpdu_2d_shft_u, etpdu_2d_shift_v, etpdu_2d_delta_size_u, etpdu_2d_delta_size_v, etpdu_points, etpdu_patch_count, etpdu_ref_index, etpdu_offset, etpdu_mode, sps_enhanced_occupancy_map_texture_patch_present_flag, sps_enhanced_occupancy_map_depth_for_enabled_flag, sps_eom_texture_patch_separate_video_present_flag, pfdu_eom_texture_patch_count, pfdu_patch_count_minus1, patch_mode are descriptive terms. As such, they do not preclude the use of other syntax element names.

Various embodiments refer to rate distortion optimization. In particular, during the encoding process, the balance or trade-off between the rate and distortion is usually considered, often given the constraints of computational complexity. The rate distortion optimization may be usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. A mix of these two approaches may also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Also, as used herein, the word "signal" refers to, among other things, indicating something to a corresponding decoder. For example, in certain embodiments the encoder signals a particular syntax element SE1 and, possibly a syntax element SE2. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
   transmitting at least one texture patch representing a texture value of at least one in-between 3D sample of a point cloud frame, wherein transmitting the texture patch comprises transmitting at least one first syntax element representative of a 2D location of said texture patch defined in a 2D grid, and of a size of said texture patch, wherein the at least one in-between 3D sample is a 3D sample of the point cloud frame located along a same projection line between a first 3D sample of the point cloud frame and a second 3D sample of the point cloud frame, and a position of the at least one in-between 3D sample along the projection line is indicated by one bit of a codeword stored in a reference patch of an occupancy map.

2. The method of claim 1, wherein transmitting the texture patch further comprises transmitting at least one second syntax element representative of a number of 2D samples in the texture patch of the 2D grid.

3. The method of claim 1, wherein transmitting the at least one texture patch further comprises transmitting at least one second syntax element representative of a number of reference patches in the 2D grid storing bits for in-between 3D samples whose texture values are stored in the at least one texture patch.

4. A method comprising decoding a point cloud frame including:
decoding at least one first syntax element representative of a 2D location of at least one texture patch defined in a 2D grid, and of a size of said texture patch, said at least one texture patch representing a texture value of at least one in-between 3D sample of the point cloud frame, wherein the at least one in-between 3D sample is a 3D sample of the point cloud frame located along a same projection line between a first 3D sample of the point cloud frame and a second 3D sample of the point cloud frame and a position of the at least one in-between 3D sample along the projection line is indicated by one bit of a codeword stored in a reference patch of an occupancy map,
retrieving said at least one texture patch based on said 2D location of said texture patch and said size of said texture patch.

5. The method of claim 4, wherein said at least one in-between 3D sample being a 3D sample of the point cloud frame having a depth value greater than the first 3D sample of the point cloud frame and lower than the second 3D sample of the point cloud frame, the at least one in-between 3D sample and the first and second 3D samples being projected along the same projection line.

6. The method of claim 4, wherein decoding a point cloud frame further comprises decoding at least one second syntax element representative of a number of 2D samples of the texture patch of the 2D grid.

7. The method of claim 4, wherein the method further comprises decoding at least one second syntax element representative of a number of reference patches in the 2D grid storing bits for in-between 3D samples whose texture values are stored in the at least one texture patch.

8. The method of claim 4, wherein the method further comprises receiving a second syntax element indicating that said at least one first syntax element is received at different levels of whole syntax representing the point cloud frame.

9. An apparatus comprising one or more processors configured for:
transmitting at least one texture patch representing a texture value of at least one in-between 3D sample of a point cloud frame, wherein transmitting the texture patch comprises transmitting at least one first syntax element representative of a 2D location of said texture patch defined in a 2D grid, and of a size of said texture patch, wherein the at least one in-between 3D sample is a 3D sample of the point cloud frame located along a same projection line between a first 3D sample of the point cloud frame and a second 3D sample of the point cloud frame, and a position of the at least one in-between 3D sample along the projection line is indicated by one bit of a codeword stored in a reference patch of an occupancy map.

10. The apparatus of claim 9, wherein transmitting the texture patch further comprises transmitting at least one second syntax element representative of a number of 2D samples in the texture patch of the 2D grid.

11. The apparatus of claim 9, wherein transmitting the texture patch further comprises transmitting at least one second syntax element that comprises a number of reference patches in the 2D grid storing bits for in-between 3D samples whose texture values are stored in the at least one texture patch and an offset to determine a starting location in the at least one texture patch of texture values of in-between 3D samples whose positions is stored a given reference patch.

12. The apparatus of claim 11, wherein said at least one second syntax element also comprises an index of the given reference patch.

13. An apparatus comprising one or more processors configured for decoding a point cloud frame including:
decoding at least one first syntax element representative of a 2D location of at least one texture patch defined in a 2D grid, and of a size of said texture patch, said at least one texture patch representing a texture value of at least one in-between 3D sample of the point cloud frame, wherein the at least one in-between 3D sample is a 3D sample of the point cloud frame located along a same projection line between a first 3D sample of the point cloud frame and a second 3D sample of the point cloud frame and a position of the at least one in-between 3D sample along the projection line is indicated by one bit of a codeword stored in a reference patch of an occupancy map,
retrieving said at least one texture patch based on said 2D location of said texture patch and said size of said texture patch.

14. A non-transitory computer-readable medium comprising a bitstream including:
data representing at least one texture patch representing a texture value of at least one in-between 3D sample of a point cloud and at least one first syntax element representative of a 2D location of said texture patch defined in a 2D grid, and of a size of said texture patch, wherein the at least one in-between 3D sample is a 3D sample of the point cloud frame located along a same projection line between a first 3D sample of the point cloud frame and a second 3D sample of the point cloud frame and a position of the at least one in-between 3D sample along the projection line is indicated by one bit of a codeword stored in a reference patch of an occupancy map.

15. A non-transitory computer-readable medium including instructions for causing one or more processors to perform:
transmitting at least one texture patch representing a texture value of at least one in-between 3D sample of a point cloud frame, wherein transmitting the at least one texture patch comprises transmitting at least one first syntax element representative of a 2D location of said texture patch defined in a 2D grid, and of a size of said texture patch, wherein the at least one in-between 3D sample is a 3D sample of the point cloud frame located along a same projection line between a first 3D sample of the point cloud frame and a second 3D sample of the point cloud frame and a position of the at least one in-between 3D sample along the projection line is indicated by one bit of a codeword stored in a reference patch of an occupancy map.

16. A non-transitory computer-readable medium including instructions for causing one or more processors to perform decoding a point cloud frame including:

decoding at least one first syntax element representative of a 2D location of at least one texture patch defined in a 2D grid, and of a size of said texture patch, said at least one texture patch representing a texture value of at least one in-between 3D sample of a point cloud frame, wherein the at least one in-between 3D sample is a 3D sample of the point cloud frame located along a same projection line between a first 3D sample of the point cloud frame and a second 3D sample of the point cloud frame and a position of the at least one in-between 3D sample along the projection line is indicated by one bit of a codeword stored in a reference patch of an occupancy map, retrieving said at least one texture patch based on said 2D location of said texture patch and said size of said texture patch.

17. The method of claim 7, wherein the at least one third second syntax element is also representative of an offset to determine a starting location in the at least one texture patch of texture values of in-between 3D samples whose positions is stored a given reference patch.

18. The method of claim 17, wherein the at least one second syntax element is also representative of an index of the given reference patch.

\* \* \* \* \*